(12) United States Patent
Inomori et al.

(10) Patent No.: US 8,381,891 B2
(45) Date of Patent: Feb. 26, 2013

(54) FRICTION CLUTCH

(75) Inventors: Toshinori Inomori, Shizuoka (JP);
Yousuke Ishida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1007 days.

(21) Appl. No.: 12/392,440

(22) Filed: Feb. 25, 2009

(65) Prior Publication Data

US 2009/0250304 A1 Oct. 8, 2009

(30) Foreign Application Priority Data

Feb. 25, 2008 (JP) ................................. 2008-043510

(51) Int. Cl.
*F16D 43/08* (2006.01)

(52) U.S. Cl. ................................. 192/70.27; 192/105 B

(58) Field of Classification Search ................. 192/70.27
See application file for complete search history.

(56) References Cited

U.S. PATENT DOCUMENTS 3,265,172 A * 8/1966 Atsumi et al. ............... 192/55.6

FOREIGN PATENT DOCUMENTS

JP 2003-322177 11/2003

* cited by examiner

*Primary Examiner* — David D Le
*Assistant Examiner* — Ryan Dodd
(74) *Attorney, Agent, or Firm* — Keating & Bennett, LLP

(57) ABSTRACT

A friction clutch has a clutch housing including a friction plate, a clutch boss including a clutch plate, and a pressure plate causing the friction plate and the clutch plate to contact each other by moving in a predetermined direction. A clutch spring applies a biasing force in a direction of causing the pressure plate to press the friction and clutch plates into contact with each other. An annular retainer receives a reaction force to the biasing force of the clutch spring by supporting one end of the clutch spring opposite to the pressure plate. A circlip of a notched ring shape is fitted into an inner peripheral side of the clutch housing. The circlip locks the retainer to the clutch housing by abutting on an opposite side of the retainer. The retainer is configured to suppress radially inward deformation of the circlip when a vehicle engine is driven.

15 Claims, 18 Drawing Sheets

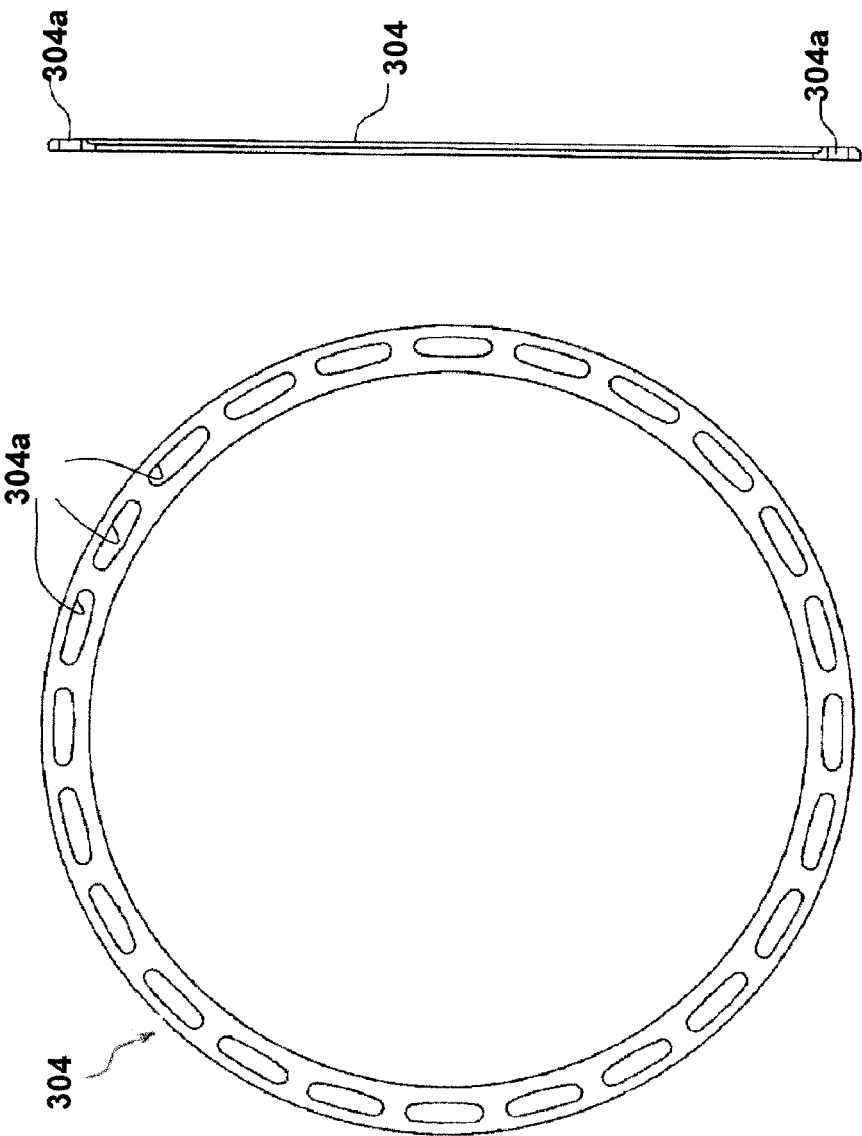

FRICTION CLUTCH

PRIORITY INFORMATION

This patent application is based on and claims priority under 35 U.S.C. §119 to Japanese Patent Application No. 2008-043510, filed on Feb. 25, 2008, the entire contents of which is hereby expressly incorporated by reference.

TECHNICAL FIELD

The present invention relates to a friction clutch.

BACKGROUND

There is conventionally known a friction clutch configured to restrict positions of constituent elements of the friction clutch such as clutch plates and a clutch spring related to rotation of a clutch shaft in an axial direction of the clutch shaft. The friction clutch described in Japanese Laid-Open Patent Application Publication No. 2003-322177, for example, has such a structure.

The friction clutch described in Japanese Laid-Open Patent Application Publication No. 2003-322177 is a multiple-disc automatic centrifugal friction clutch used in a motorcycle. The multiple-disc automatic centrifugal friction clutch includes a clutch shaft (=main shaft), a drive plate (=friction plate), and a driven plate (=clutch plate). Furthermore, the multiple-disc automatic centrifugal friction clutch includes a weight roller (=centrifugal weight) and a pressure plate. The pressure plate and the drive plate can slidably move in an axial direction (=thrust direction) of the clutch shaft. By movement of the pressure plate in the thrust direction, the drive plate and the driven plate are pressed. The weight roller receives a centrifugal force by rotation of the clutch shaft and moves radially outward of the clutch shaft. The centrifugal force of the weight roller is converted into a pressing force in the thrust direction of the pressure plate due to the internal structure of the clutch. The drive plate and the driven plate are pressed by the pressing force of the pressure plate. The drive plate and the driven plate which are pressed transmit a drive force of an engine of the motorcycle to a rear wheel.

Moreover, the multiple-disc automatic centrifugal friction clutch includes a clutch plate spring (=clutch spring) generating the pressing force of the pressure plate. Namely, the clutch plate spring presses the drive plate and the driven plate. Further, the pressurization on the drive plate and the driven plate holds the drive plate and the driven plate at predetermined positions at predetermined intervals. Due to this, the multiple-disc automatic centrifugal friction clutch includes a circlip (retaining ring) for restricting positions of constituent elements of a clutch housing such as the pressure plate, the drive plate, the driven plate, the centrifugal weight, and the clutch plate spring in the axial direction of the clutch shaft. This circlip is fitted into the clutch housing covering up the drive plate and the driven plate included in the clutch. A position at which the circlip is fitted into the clutch housing is one end side of the clutch housing in the axial direction of the clutch shaft. The circlip restricts positions of the constituent elements of the clutch housing such as the plate, the centrifugal weight, and the clutch plate spring related to rotation of the clutch shaft in the axial direction of the clutch shaft by being fitted into the clutch housing. Further, the circlip receives a reaction force to the biasing force of the clutch plate spring and prevents detachment of such plates as the drive plate and the driven plate from the clutch housing by being fitted into the clutch housing.

However, if engine power is to be improved in a motorcycle or the like, it is necessary to ensure transmitting the drive force of the high-power engine. Due to this, the clutch serving as a transmission mechanism transmitting the drive force of the engine is configured, for example, so that the diameters of the plates including the friction plate and the clutch plate are increased so as to correspond to the configuration of the high-power engine. In the clutch having such larger-diameter plates, the diameter of the circlip preventing detachment of such plates as the friction plate and the clutch plate is also made larger.

Nevertheless, the inventor of the present application has discovered from various experiments that the circlip often detaches from the clutch housing in friction clutches including a larger diameter circlip.

The present invention has been devised in view of the foregoing problems, and it is an object of the present invention to prevent a retaining ring (such as a circlip) from detaching from a clutch housing.

The inventor of the present application has exerted utmost efforts as well as conducted studies to attain the foregoing object and has discovered that a main cause for detachment of the circlip is a radially inward deformation of the circlip. Specifically, the inventor has discovered that the shape of the circlip and the load imposed on the circlip play a role in the detachment of the circlip. The circlip typically has a substantially annular shape in which an outer circumferential side of the circlip is fitted into the clutch housing. Consequently, deformation of the circlip tends to occur on the inner circumferential side rather than on the outer circumferential side. This deformation is considered to result from the fact that the circlip has the substantially annular shape and, more particularly, has a so-called C shape with a slit formed in a portion of the circlip.

A C-shaped circlip 85 is shown, for example, in FIGS. 5a and 5b. Circlip 85 has a slit or notched portion 85b. When circlip 85 is fitted into a clutch housing, the diameter of the outer circumference of the circlip is temporarily reduced so as to be smaller than an inner hull of the clutch housing. The diameter of the circlip is reduced, for example, by applying an external compressing force to the circlip so that the terminal ends of circlip 85 come into contact with each other. The circlip fitted into the clutch housing generates an expanding force extending along the circlip diameter (hereinafter, referred to as "extension force"). This extension force enables the inner hull of the clutch housing and the outer circumference of this circlip to contact each other.

Furthermore, similarly to the clutch described in Japanese Laid-Open Patent Application Publication No. 2003-322177, the clutch employing the circlip shown in FIGS. 5a and 5b often includes a clutch spring (clutch plate spring). In this case, similarly to the circlip described in Japanese Laid-Open Patent Application Publication No. 2003-322177, circlip 85 is fitted into the clutch housing, thereby receiving a reaction force to the biasing force of the clutch spring. The reaction force to the biasing force of the clutch spring causes the front and rear terminal end surfaces (FIG. 5a) of the circlip to make contact with the clutch housing. The contact of the circlip 85 with the clutch housing allows the circlip 85 and the clutch housing to generate a frictional force in a portion in which the circlip 85 and the clutch housing contact each other.

Moreover, if the clutch including the circlip 85 is a centrifugal clutch similar to the clutch described in Japanese Laid-Open Patent Application Publication No. 2003-322177, the magnitude of the reaction force to the biasing force of the clutch spring varies according to the change in rotational speed of the clutch shaft. Namely, in the case of the clutch described in Japanese Laid-Open Patent Application Publication No. 2003-322177, for example, the weight roller receives the centrifugal force and moves radially outward relative to the clutch shaft by rotation of the clutch shaft. The centrifugal force of the weight roller is converted into a pressing force in the thrust direction of the pressure plate by the internal structure of the clutch. The drive plate and the driven plate are pressed by the pressing force of the pressure plate. During pressing, the drive plate and the driven plate are forced to separate from each other by mutual resistance forces or the like. Due to this, the clutch includes the clutch plate spring as means for generating the pressing force. If the rotational speed of the clutch shaft is higher, the clutch plate spring needs a greater biasing force for pressing the drive plate and the driven plate. In this way, if the biasing force of the clutch disc spring is of relatively high magnitude, the circlip receives a greater reaction force to the biasing force of the clutch plate spring. If the reaction force to the biasing force of the clutch plate spring is greater, a greater frictional force is generated in the portion of the circlip that contacts the clutch housing.

Further, as the clutch shaft rotates, a centrifugal force is generated at mass points on a circular portion of the circlip. This centrifugal force is greater if the rotational speed of the clutch shaft is higher. This centrifugal force and the extension force of the circlip described previously enable the circlip to make contact with the inner hull of the clutch housing on the outer circumferential side of the circlip.

As stated above, the outer circumferential side of the circlip contacts the inner hull of clutch housing by the extension force which is directed radially outward of the circlip. Further, the circlip receives the reaction force to the biasing force of the clutch spring. The front and rear surfaces (front and rear surfaces in FIG. 5a) of the circlip make contact with the clutch housing due to the reaction force of the clutch housing to the biasing force. Due to this, a frictional force is generated in the portion of the circlip that contacts the clutch housing. However, the frictional force applied to the portion of the circlip that contacts the clutch housing is not uniform on the entire circlip. Namely, the force due to friction with the clutch housing differs in magnitude or the like among the mass points on the circlip. This results from the fact that the shape of the outer circumferential side of the circlip does not completely conform to the shape of the inner hull of the clutch housing. Furthermore, surfaces of the circlip and the clutch housing are not completely flat physically, so that portions in which the clutch housing contacts the circlip may include small spaces therebetween. Besides, during driving of the engine related to actuation of the clutch, the frictional force is considered to change at the respective mass points on the circlip.

If the frictional force changes at the respective mass points on the circlip, the circlip is considered to undergo deformation. However, the outer circumferential side of the circlip can make contact with the inner hull of the clutch housing. Due to this, it is considered that the inner circumferential side of the circlip deforms more easily than the outer circumferential side thereof.

SUMMARY

The inventor of the present patent document has conducted studies concerning the radially inward deformation of the circlip, and, as a result attained the inventions described herein. In one aspect, the invention is directed to a friction clutch. In one embodiment, the friction clutch includes a main shaft driven to rotate by the engine, a clutch housing including a first plate, and rotating along the main shaft, a clutch boss including a second plate opposed to the first plate in a predetermined direction, a pressure plate causing the first plate and the second plate to contact each other by moving in the predetermined direction, a clutch spring arranged on the opposite side of the pressure plate relative to the first and second plates in the predetermined direction, the clutch spring having a biasing force in a direction of causing the first plate and the second plate to contact each other to the pressure plate, a retainer formed into a substantially circular shape and receiving a reaction force to the biasing force of the clutch spring by supporting one end of the clutch spring opposite to the pressure plate, and a retaining ring having a substantially circular shape, the retaining ring having a slit which extends in a radial direction and is formed in a circumferential part of the retaining ring, the retaining ring being fitted into an inner peripheral side of the clutch housing, the fitted retaining ring locking the retainer to the clutch housing by abutting on an opposite side of the retainer relative to the clutch spring, the friction clutch being configured to suppress the circlip from deforming radially inward.

With the foregoing arrangement, it is possible to prevent detachment of the retaining ring (circlip or the like) from the clutch housing.

In another aspect, the invention is directed at a vehicle, such as a motorcycle, including a frictional clutch as described herein.

BRIEF DESCRIPTION OF THE DRAWINGS

FIG. 5a is a front view of a circlip according to a first embodiment.

FIG. 5b is a cross-sectional view of the circlip of FIG. 5a.

FIG. 6a is a front view of a retainer according to the first embodiment.

FIG. 6b is a cross-sectional view of the retainer of FIG. 6a.

FIG. 9a is a front view of a retainer according to a first modification of the first embodiment.

FIG. 9b is a cross-sectional view of the retainer of FIG. 9a.

FIG. 12a is a front view of a retainer according to a second modification of the first embodiment.

FIG. 12b is a cross-sectional view of the retainer of FIG. 12a.

FIG. 15a is front view of a retainer according to a second embodiment.

FIG. 15b is a cross-sectional view of the retainer of FIG. 15a.

FIG. 16a is front view of a circlip according to the second embodiment.

FIG. 16b is a cross-sectional view of the circlip of FIG. 16a.

DETAILED DESCRIPTION

Figure 1:
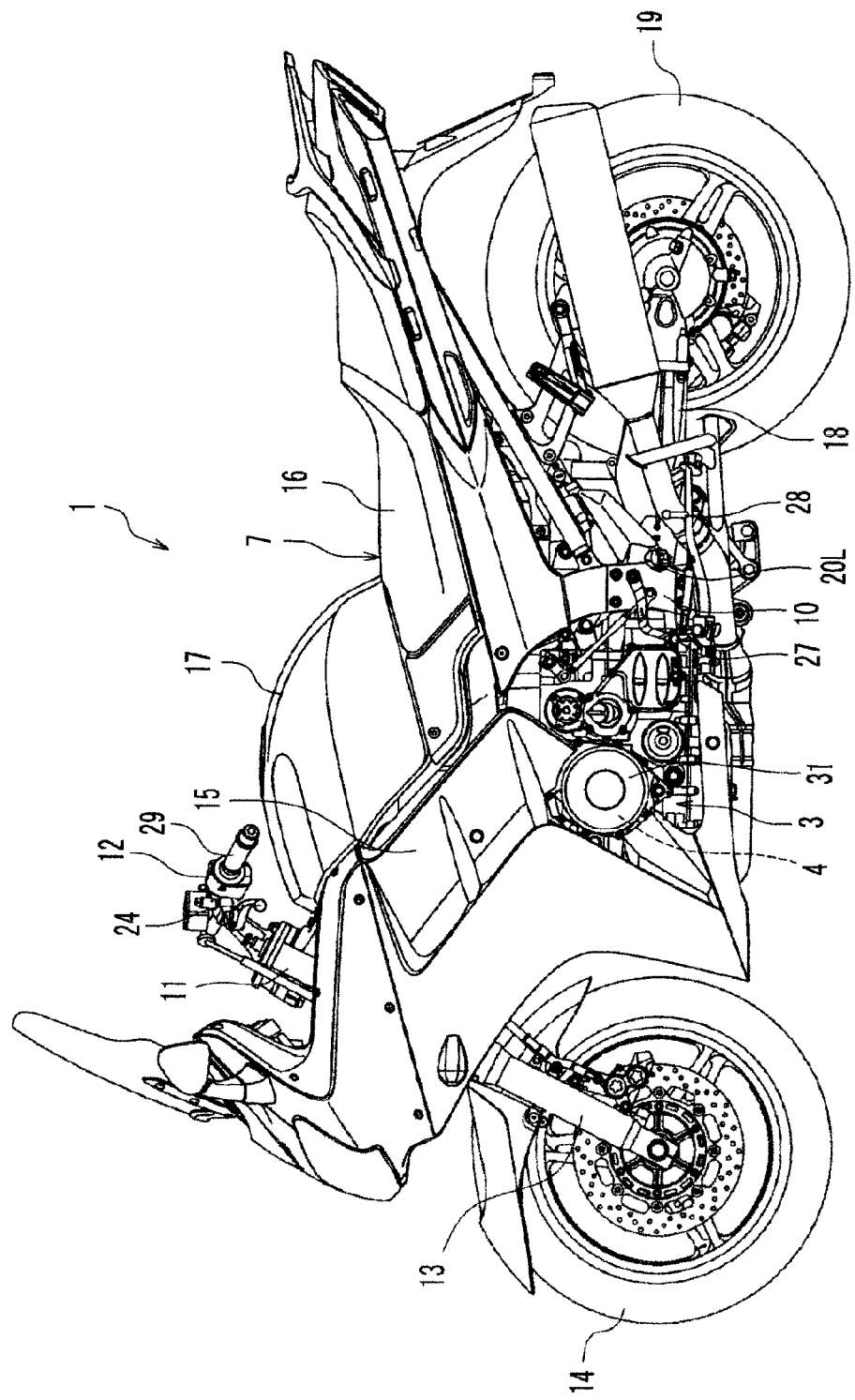
FIG. 1 is a side view of a motorcycle.

Prior to describing the embodiments of the present invention, the background of the present invention will be described first.

As already stated, in the clutch having larger-diameter plates such as the friction plate and the clutch plate, the diameter of the circlip preventing detachment of such plates as the friction plate and the clutch plate is also made larger. Furthermore, since it is necessary to increase the pressing force of the pressure plate (which presses the friction plate and the clutch plate), the biasing force of the clutch spring urging this pressing force is also increased. If the biasing force of the clutch spring is greater, the load imposed on the circlip receiving the reaction force to the biasing force of the clutch spring becomes heavier.

The centrifugal force is generated at respective mass points on the circlip when the clutch shaft rotates during driving of the engine. In a high-power engine, a greater centrifugal force according to the mass of the circlip is generated in a larger-diameter circlip than in a smaller-diameter circlip. Moreover, if the clutch shaft rotates at high speed by being driven by the engine at high engine speed, a greater centrifugal force is generated than that generated when the clutch shaft rotates at low rotational speed.

Furthermore, the length of a circular arc on the outer circumferential side of the circlip which is in contact with the inner hull of the clutch housing would be a function of the diameter of the circlip. Due to this, if the circlip has a larger diameter, the contact area between the inner hull of the clutch housing and the outer circumferential side of the circlip is also larger. Therefore, the frictional force generated between the outer circumferential side of the larger-diameter circlip and the inner hull of the clutch housing varies in accordance with the size of the contact area.

The detachment of the circlip is conspicuously recognized when the drive force is instantaneously recovered from driving of the engine at high engine speed. Namely, the detachment of the circlip is a phenomenon that occurs when a throttle valve used to drive the engine is closed to a minimum opening position instantaneously from a maximum opening position. Due to this, the inventor of the present application has considered, as a cause for the detachment of the circlip, a sudden drop in the rotational speed of the clutch shaft and a sudden drop in the centrifugal force on the entire circlip, accordingly. Further, when the centrifugal force of the entire circlip suddenly drops, it is considered that the frictional force between the circlip and the clutch housing also suddenly falls. The circlip for which the frictional force between the circlip and the clutch housing falls is considered to rotate relative to the clutch housing. The rotation of the circlip relative to the clutch housing is considered to result from sliding of the circlip having an inertial force generated by the rotation of the clutch shaft on the clutch housing having the reduced frictional force.

As already stated, the frictional force differs among the mass points on the circlip in magnitude or the like. Due to this, during the relative rotation of the circlip to the clutch housing, it is considered that the inertial force is greater than the frictional force at some mass points and that the frictional force is greater than the inertial force at other mass points. Therefore, the inventor of the present application has estimated that the circlip deforms according to changes in the magnitude or the like of the frictional force at respective mass points on the circular portion of the circlip.

Figure 5:
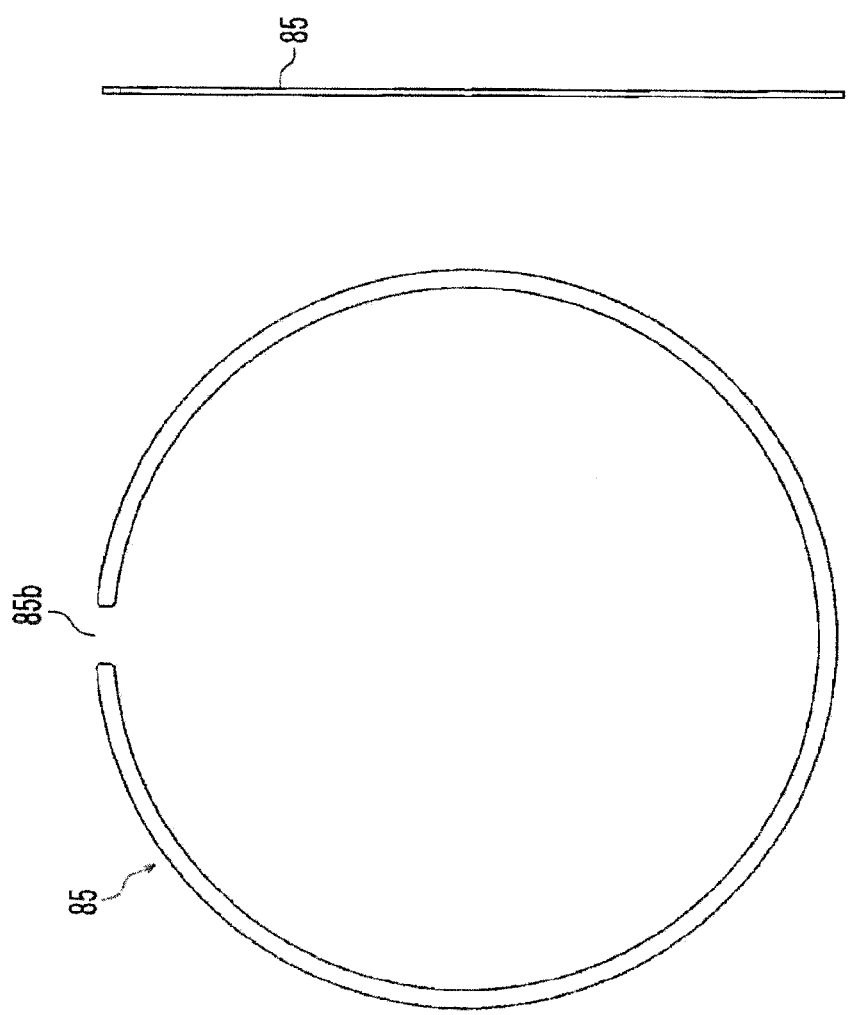

In Japanese Laid-Open Patent Application Publication No. 2003-322177, the shape of the circlip is not limited to a specific shape. However, the circular C shape (see FIG. 5) is popular and normally adopted as the shape of the circlip. Due to this, the inventor of the present application has used a C-shaped circlip in a clutch without exception. As shown in FIG. 5a, the circlip 85 includes slit or notched portion 85b. Since the outer circumferential side of the circlip 85 is fitted into the clutch housing, the deformation of the outer circumferential side of the circlip 85 is less likely to occur. However, the inner circumferential side of the circlip 85 is considered to deform more easily than the outer circumferential side thereof.

If the inner circumferential side of the circlip 85 deforms radially inward, the circlip 85 often temporarily detaches from the portion (clutch housing) held in the clutch instantaneously. Even if a detached portion is only a part of the circlip 85, the circlip 85 instantaneously detaches from the clutch housing due to the significant biasing force of the clutch spring.

Therefore, an interior of the clutch is configured to suppress the radially inward deformation of the circlip so as to be able to prevent the detachment of the circlip from the clutch housing.

First Embodiment

A vehicle including a centrifugal clutch according to embodiments of the present invention will be described hereinafter in detail with reference to the drawings. It is to be noted, however, that the vehicle described below is only an example of a preferred mode for carrying out the present invention. The vehicle according to the present invention is not limited to a motorcycle 1 described below. In the present specification, the term "motorcycle" refers to a vehicle of the type whose vehicle body is designed to be leaned when making a turn. Accordingly, the term "motorcycle" as used herein is not limited to a vehicle including two wheels but may also include vehicles including three or more wheels.

FIG. 1 is a left side view of a motorcycle 1 according to an embodiment. In the following description, it is assumed that longitudinal and crosswise directions are directions viewed from a passenger seated on a seat 16 to be described later.

Configuration of Motorcycle

As shown in FIG. 1, motorcycle 1 includes a vehicle body 7, a front wheel 14 provided at a front section of the vehicle body 7, and a rear wheel 19 provided at a rear section of the vehicle body 7.

The vehicle body 7 includes a vehicle body frame 10. The vehicle body frame 10 includes a head pipe 11. A handlebar 12 is provided to an upper end portion of the head pipe 11. In addition, the front wheel 14 is rotatably mounted to a lower end of the head pipe 11 via a front fork 13.

A power unit 3 is suspended from the vehicle body frame 10. A vehicle body cover 15 is attached to the vehicle body frame 10. A seat 16 is disposed so as to extend rearward from a substantially central position of the vehicle body 7 to the rear side thereof in the front-rear direction. A fuel tank 17 is disposed in front of the seat 16.

A rear arm 18 is pivotally supported on the vehicle body frame 10. The rear wheel 19, which serves as a drive wheel, is rotatably attached to a rear end of the rear arm 18. The rear wheel 19 is connected to an engine 4 (see FIG. 2) through a power transmission mechanism (not shown). The drive force of the engine 4 is thereby transmitted to the rear wheel 19 so that the rear wheel 19 rotates.

An accelerator grip (not shown) is provided on the right side of the handlebar 12. A left grip 29 is provided on the left side of the handlebar 12. A clutch lever 24 that is operated to engage/disengage friction clutch 2 (see FIG. 2), which is described later, is provided in front of the left grip 29 of the handlebar 12.

Footrests 20L are provided on each side of the vehicle body 7 at a central portion thereof in the front-rear direction. A shift pedal 27 is operated to change the transmission gear ratio of a transmission 5 (see FIG. 2), which will be described later, is provided on the left side of the vehicle body 7 at a position slightly in front of the left footrest 20L. A side stand 28 is provided on the left side of the vehicle body 7 at a position below the shift pedal 27 and the footrest 20L.

Configuration of Power Unit

Figure 2:
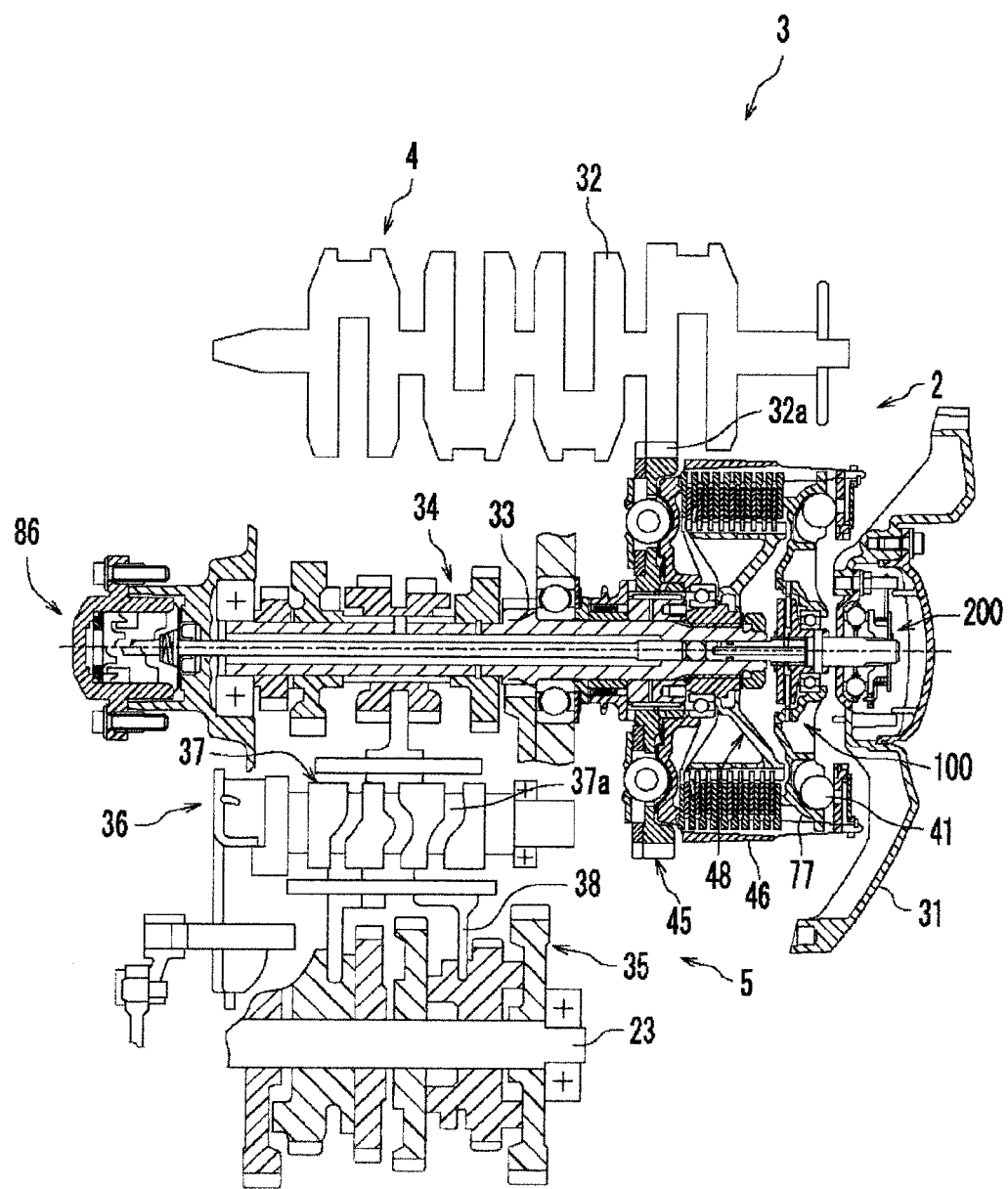
FIG. 2 is a schematic diagram illustrating the main components of a power unit of the motorcycle of FIG. 1.

The configurations of the main components of the power unit 3 of motorcycle 1 will now be described with reference to FIG. 2. As shown in FIG. 2, the power unit 3 includes the engine 4, the transmission 5, and the clutch 2. In the present embodiment, while the type of the engine 4 is not limited to a particular type of engine, a water-cooled, four-cycle, parallel four-cylinder engine is used as the engine 4.

Although not shown, the engine 4 includes four cylinders, a piston reciprocating in each of the respective cylinders, and a crankshaft 32 connected to each of the pistons via a connecting rod. The crankshaft 32 extends in a vehicle width direction. Reference numeral 31 denotes a crankcase.

As shown in FIG. 2, the crankshaft 32 is connected to the transmission 5 via the clutch 2. The transmission 5 includes a main shaft 33, a drive shaft 23, and a gear selection mechanism 36. The main shaft 33 is connected to the crankshaft 32 via the clutch 2. The main shaft 33 and the drive shaft 23 are disposed parallel to the crankshaft 32, respectively.

A plurality of multi-stage transmission gears 34 are mounted on the main shaft 33. A plurality of transmission gears 35 corresponding to the multi-stage transmission gears 34 are mounted on the drive shaft 23. The multi-stage transmission gears 34 and the plurality of transmission gears 35 are disposed so that only one pair of selected gears is engaged with each other. Either the transmission gears 34 excluding the selected transmission gear 34 or the transmission gears 35 excluding the selected transmission gear 35 are rotatable with respect to the main shaft 33 or the drive shaft 23 or both. That is, at least one of the non-selected transmission gears 34 or the non-selected transmission gears 35 run idle with respect to the main shaft 33 or the drive shaft 23. In other words, rotation is transmitted between the main shaft 33 and the drive shaft 23 only via the selected transmission gear 34 and the selected transmission gear 35 which are engaged with each other.

The transmission gears 34 and 35 are selected by the gear selection mechanism 36. Specifically, the transmission gears 34 and 35 are selected by a shift cam 37 of the gear selection mechanism 36. A plurality of cam grooves 37a are formed on an outer circumferential surface of the shift cam 37. A shift fork 38 is engaged with each cam groove 37a. Each shift fork 38 is engaged with predetermined transmission gears 34 and 35 of the main shaft 33 and the drive shaft 23, respectively. As the shift cam 37 rotates, a plurality of shift forks 38 are guided in their respective cam grooves 37a to move in a direction of the main shaft 33, so that gears to be engaged with each other are selected from among the transmission gears 34 and 35. Specifically, among the multi-stage transmission gears 34 and the plurality of transmission gears 35, only one pair of gears disposed at positions corresponding to a rotational angle of the shift cam 37 are fixed with respect to the main shaft 38 and the drive shaft 23 by a spline. As a result, the transmission gear position is determined, and rotation between the main shaft 33 and the drive shaft 23 is transmitted at a predetermined transmission gear ratio through the transmission gears 34 and 35. The gear selection mechanism 36 is operated by the shift pedal 27 shown in FIG. 1.

With this configuration, after a pair of transmission gears 34 and 35 is fixed to the main shaft 33 and the drive shaft 23 and the clutch 2 is engaged, when the engine 4 is driven a drive force of the engine 4 is transmitted to the main shaft 33 through the clutch 2. Further, the rotation is transmitted at a predetermined transmission gear ratio between the main shaft 33 and the drive shaft 23 via the predetermined pair of transmission gears 34 and 35, so that the drive shaft 23 is driven to rotate. When drive shaft 23 is driven to rotate, drive force is transmitted by a transmission mechanism (not shown) such as a chain connecting the drive shaft 23 and the rear wheel 19, so that the rear wheel 19 is rotated. In the present embodiment, a power transmission mechanism which connects the engine 4 and the rear wheel 19 comprises the clutch 2, the transmission 5 and a transmission mechanism (not shown) such as a chain.

Configuration of Clutch

In the present embodiment, the clutch 2 is constituted by a multiple-disc friction clutch. Further, the clutch 2 is a centrifugal clutch that is automatically engaged or disengaged at the time of starting or stopping motorcycle 1 and which is optionally engaged or disengaged through the operation of the clutch lever 24 by a rider. A configuration of the clutch 2 will be described in detail.

Clutch Housing 46

Figure 3:
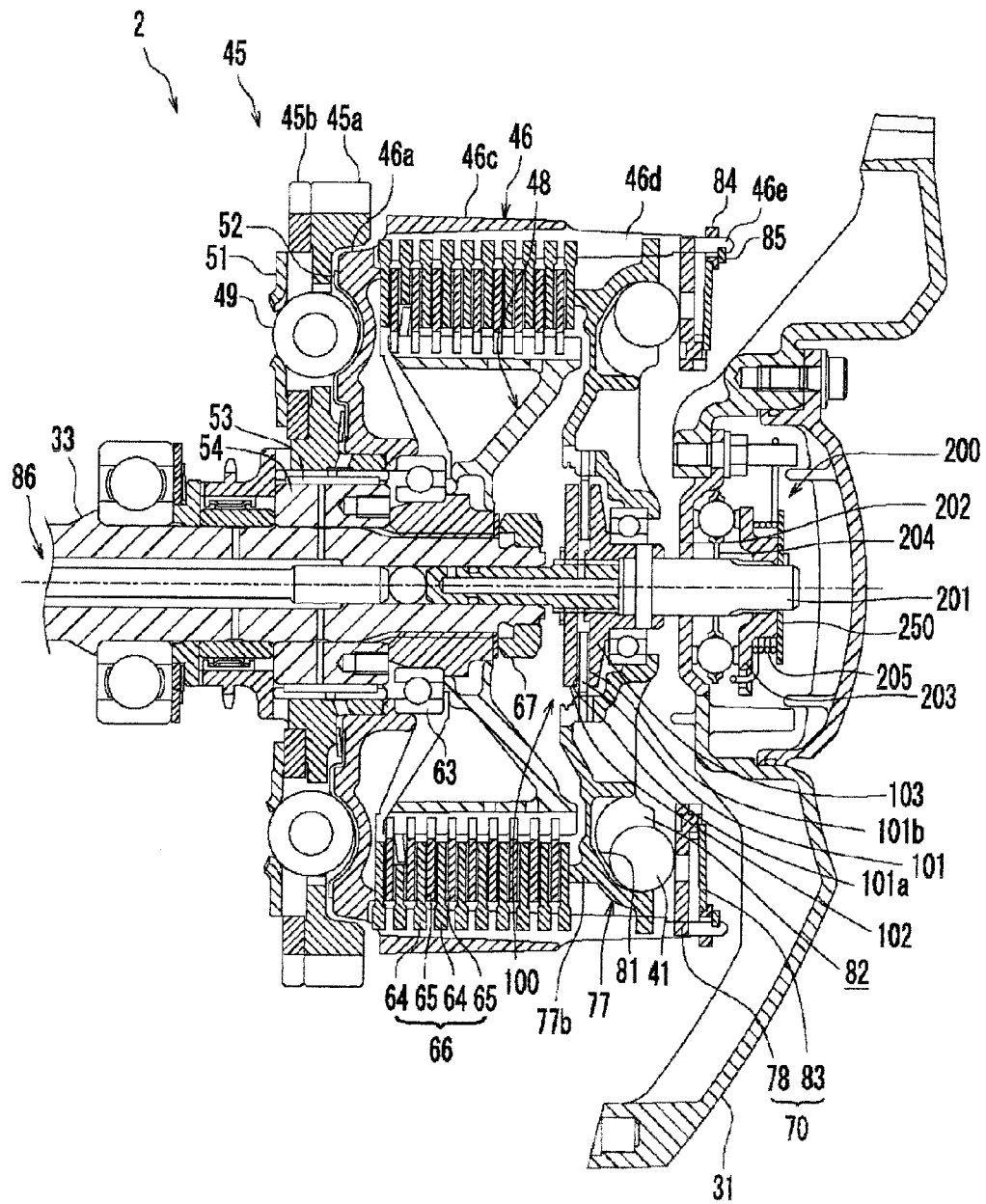
FIG. 3 is a cross-sectional view of a clutch of the motorcycle of FIG. 1.

As shown in FIG. 3, the clutch 2 includes a clutch housing 46. The main shaft 33 extends through the clutch housing 46. The clutch housing 46 includes a housing body 46c. The housing body 46c is formed in a substantially cylindrical form that is closed at one end by a bottom 46a. The main shaft 33 also extends through the bottom 46a of the housing body 46c. A plurality of pairs of arms 46d are provided on the housing body 46c. Each arm 46d extends outward from the bottom 46a toward the outside in a vehicle width direction. Further, a circlip groove 46e is provided in each arm 46d on the inner periphery of the arm 46d as described later and as shown in reference to FIG. 4.

As shown in FIGS. 2 and 3, the vehicle width direction may also be referred to as a left-right direction. In the present embodiment, the clutch 2 is disposed on the right side of the main shaft 33 such that the "outside" in the vehicle width direction corresponds to the right side, and "inside" in the vehicle width direction corresponds to the left side. Therefore, the "outside" and the "inside" in the vehicle width direction will be referred to simply as the "right side" and the "left side," respectively.

Scissor Gear 45

A scissor gear 45 is attached to the clutch housing 46. The scissor gear 45 includes two gears 45a and 45b, a spring 49, and two plates 51 and 52. The gear 45a and the gear 45b are located between the two plates 51 and 52. The two plates 51 and 52 are fixed to each other with fasteners, such as rivets and screws, in the axial direction of the main shaft 33. Therefore, the two gears 45a and 45b are substantially fixed to each other with respect to the axial direction of the main shaft 33. Meanwhile, the gears 45a and 45b are rotatable relative to each other with respect to the rotational direction.

The gears 45a and 45b have the same number of teeth. The gears 45a and 45b are arranged so that their teeth are alternately located in a circumferential direction. The spring 49 is provided between the gears 45a and 45b. Therefore, torsional torque is applied to the gears 45a and 45b by the spring 49. Thus, the torque variations caused by the engine 4 can be absorbed.

The gear 45a of the scissor gear 45 is engaged with a gear 32a (FIG. 2) of the crankshaft 32. The gear 45a (of the scissor gear 45) is fixed to the bottom 46a of the clutch housing 46 so as to be unrotatable relative thereto. With such a configuration, the gear 45a of the scissor gear 45 and the clutch housing 46 integrally rotate following the rotation of the crankshaft 32.

A needle bearing 53 and a spacer 54, which is nonrotatably fixed to the main shaft 33, are disposed between the scissor gear 45 and the main shaft 33. The needle bearing 53 enables the scissor gear 45 to be rotatable with respect to main shaft 33. In other words, rotation of the scissor gear 45 is not transmitted directly to the main shaft 33.

Clutch Boss 48

A clutch boss 48 is nonrotatably fixed to the main shaft 33 by a nut 67. That is, the clutch boss 48 rotates together with the main shaft 33. A thrust bearing 63 is disposed between the clutch boss 48 and the scissor gear 45. Thus, the scissor gear 45, the needle bearing 53, and the spacer 54 are regulated so that they do not come closer than a predetermined distance to the clutch boss 48. In other words, movement of the scissor gear 45, the needle bearing 53, and the spacer 54 toward the clutch boss 48 in the axial direction of the main shaft 33.

Plate Group 66

A plurality of friction plates 64 are arranged inside the clutch housing 46. Each friction plate 64 is fixed to the clutch housing 46 with respect to the rotational direction of the main shaft 33. Thus, the plurality of friction plates 64 rotate together with the clutch housing 46. Each friction plate 64 is displaceable in the axial direction of the main shaft 33. Thus, the distance between two adjacent friction plates 64 is variable.

The plurality of friction plates 64 are arranged in the axial direction of the main shaft 33. A clutch plate 65 is disposed between adjacent friction plates 64. The clutch plate 65 is opposed to the adjacent friction plates 64. Each clutch plate 65 is fixed to the clutch boss 48 with respect to the rotational direction of the main shaft 33. Thus, the plurality of clutch plates 65 rotates together with the clutch boss 48. Further, each clutch plate 65 is displaceable with respect to the axial direction of the main shaft 33. Thus, the distance between mutually adjacent clutch plates 65 is variable.

In the present embodiment, a plate group 66 comprises the plurality of friction plates 64 and the plurality of clutch plates 65, as shown in FIG. 3.

Pressure Plate 77

A pressure plate 77 is arranged on the right side of the main shaft 33, as depicted in reference to FIG. 3. The pressure plate 77 is formed into a substantially disc shape. A sub clutch 100, to be described later, is provided at a central portion of the pressure plate 77. A radially outward end of the pressure plate 77 is engaged with arms 46d. Therefore, the pressure plate 77 is not rotatable with respect to the clutch housing 46 but it rotates together with the clutch housing 46.

A pressing portion 77b that projects toward the plate group 66 is formed on the pressure plate 77 at an outer section thereof, as illustrated in FIG. 3. The pressing portion 77b faces the rightmost friction plate 64 in the plate group 66. When the pressure plate 77 moves leftward, the pressing portion 77b pushes the plate group 66 leftward. As a result, the friction plates 64 and the clutch plates 65 in the plate group 66 are press-contacted into frictional contact with each other.

A plurality of cam surfaces 81, each of which supports a roller weight 41, are formed on a surface opposite to the plate group 66 in the radially outward portion of the pressure plate 77. The plurality of cam surfaces 81 and the plurality of roller weights 41 are provided along the circumferential direction. The plurality of cam surfaces 81 are arranged radially about the longitudinal axis of the main shaft 33. Each cam surface 81 is inclined rightward as it moves outward in the radial direction.

A roller retainer 78 is disposed on the right side of the pressure plate 77. The roller retainer 78 is formed into a ring band shape when viewed from the axial direction of the main shaft 33. The roller retainer 78 is opposed to the cam surface 81 of the pressure plate 77. Therefore, a space 82 that becomes narrower in the radial direction of the main shaft 33 is formed by each cam surfaces 81 and the roller retainer 78.

Similar to the pressure plate 77, a radially outward end of the roller retainer 78 is engaged with the plurality of arms 46d. The roller retainer 78 is thereby nonrotatable about the clutch housing 46. In other words, the roller retainer 78 rotates together with the clutch housing 46. Meanwhile, the roller retainer 78 is displaceable with respect to the clutch housing 46 in the axial direction of the main shaft 33.

The roller retainer 78 is urged leftward by a disc spring 83 which serves as a biasing member. In other words, the roller retainer 78 is urged toward the plate group 66 by disc spring 83. The roller retainer 78 and the disc spring 83 constitute an abutment member 70 that presses the roller weights 41 toward the cam surfaces 81.

A roller weight 41 is provided in each of a plurality of spaces 82. The roller weight 41 revolves following the rotation of the clutch housing 46 and moves on the cam surface 81 radially outward by means of a centrifugal force generated during the revolution. The roller weight 41 receives a biasing force from abutment member 70 and presses the pressure plate 77 toward the plate group (66) side.

When the rotational speed of the crankshaft 32 is lower than a predetermined value, such as an idling state, the rotational speed of the clutch housing 46 also becomes lower. Therefore, centrifugal force applied to each roller weight 41 is relatively small, and so the roller weight 41 is located relatively inward. Therefore, the force by which the roller weight 41 presses the pressure plate 77 leftward thereby weakens. As a result, the degree of pressure contact of the plate group 66 is reduced, and the torque transmittable from the clutch housing 46 to the clutch boss 48 thereby becomes relatively small.

On the other hand, when the rotational speed of the crankshaft 32 becomes relatively high, the rotational speed of the clutch housing 46 also becomes relatively high. Hence, as the rotational speed of the clutch housing 46 increases, the centrifugal force exerted on the roller weights 41 also increases. If the centrifugal force exerted on the roller weights 41 is equal to or more than a predetermined value, the roller weights 41 move outward. The pressure plate 77 is thereby pressed toward the left side by the roller weights 41 and moves toward the plate group 66. As a result, the plate group 66 is placed in a relatively strong pressed-contact state and the amount of torque that is transmittable from the clutch housing 46 to the clutch boss 48 is thereby relatively increased.

Sub Clutch 100

As shown in FIG. 3, the clutch 2 according to the present embodiment includes a sub-clutch 100. The sub-clutch 100 includes a friction plate 101, a first pressing plate 102 that faces a left surface (hereinafter, "first friction surface") 101a of the friction plate 101, and a second pressing plate 103 that faces a right surface (hereinafter, "second friction surface") 101b of the friction plate 101.

Clutch Release Mechanism 86

The clutch 2 according to the present embodiment includes a clutch release mechanism 86 (FIG. 3). The clutch release mechanism 86 forcibly releases a pressed-contact state of the plate group 66 in response to the operation of the clutch lever 24 by a rider. The clutch release mechanism 86 enables the clutch 2 to be disengaged by the manual operation of a rider of the motorcycle 1.

Power-Assist Mechanism

As shown in FIG. 3, the clutch 2 according to the present embodiment includes a power-assist mechanism 200. The power-assist mechanism 200 converts part of the torque of the pressure plate 77 into a force for disengaging the clutch 2 so as to reduce the force required to disengage the clutch 2. The power-assist mechanism 200 according to the present embodiment comprises a so-called ball cam. Particularly, the power-assist mechanism 200 includes a slide shaft 201 fixed to the second pressing plate 103, a first cam plate 202, a second cam plate 203, a ball plate 204, and a coil spring 205 that biases the second cam plate 203 in a direction which separates the second cam plate 203 from the first cam plate 202. A support plate 250 that supports the coil spring 205 by abutting a right portion of the coil spring 205 is fixed onto a terminal side of the slide shaft 201. It is to be noted that the power-assist mechanism 200 is not limited to the ball cam structure and may be configured as any other appropriate structure as long as the power-assist mechanism is configured to reduce the force required to disengage the clutch 2.

Retainer

Figure 6:
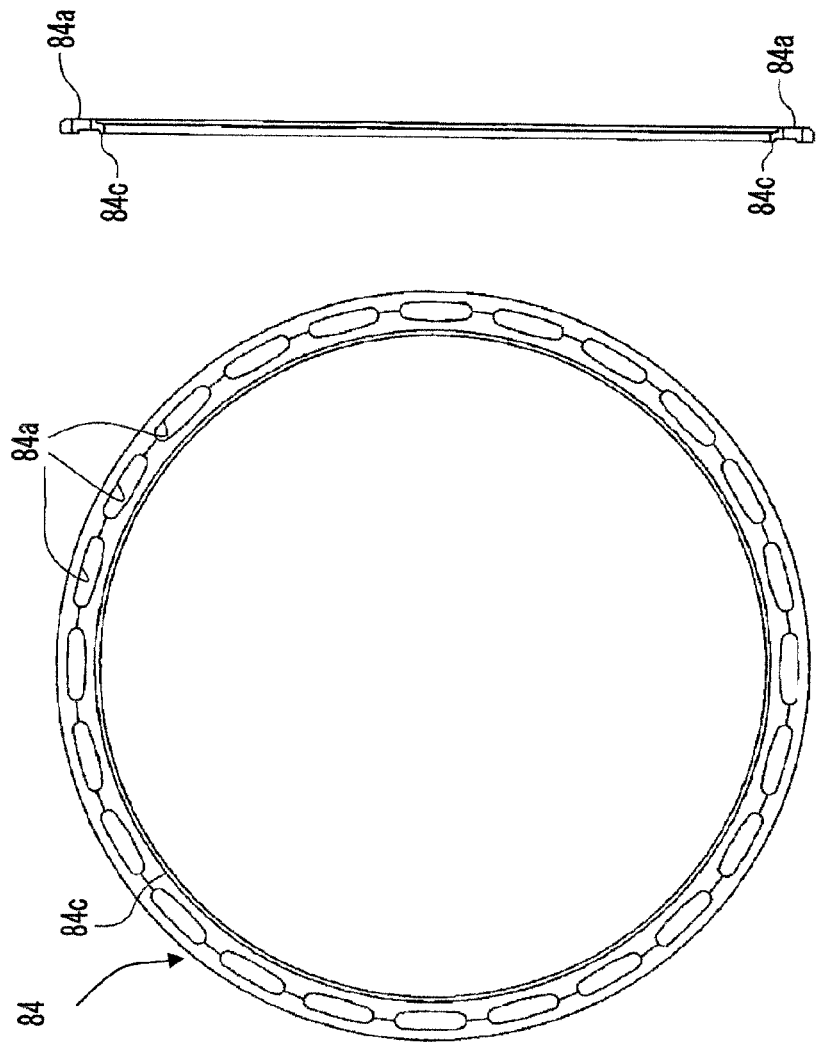

A retainer 84 is arranged on a right end of the housing body 46c. As shown in FIG. 6a, the retainer 84 is shaped to be fitted into an outer hull of the housing body 46c. In the present embodiment, the clutch housing 46 is cylindrical. Due to this, the retainer 84 is ring-shaped. The retainer 84 includes mount holes 84a. The arms 46d (see FIGS. 3 and 4) of the housing body 46c are fitted into the mount holes 84a.

Stopper

A stopper 84c (FIGS. 6a-6b) is provided on the retainer 84 along the inner circumference of the retainer 84. The stopper 84c is shaped so that the inner circumference of the circular portion of the retainer 84 includes a shoulder protruding from the front surface as shown in reference to FIG. 6b and FIG. 8 (e.g., the left direction in FIG. 6b and the right direction in FIG. 8).

Circlip

FIG. 5a is a front plan view of circlip 85 according to the present embodiment. The circlip 85 has a notched ring shape configured to lock the retainer 84 onto the housing body 46c. The circlip 85 includes slit or notched portion 85b as depicted in reference to FIG. 5a.

Figure 7:
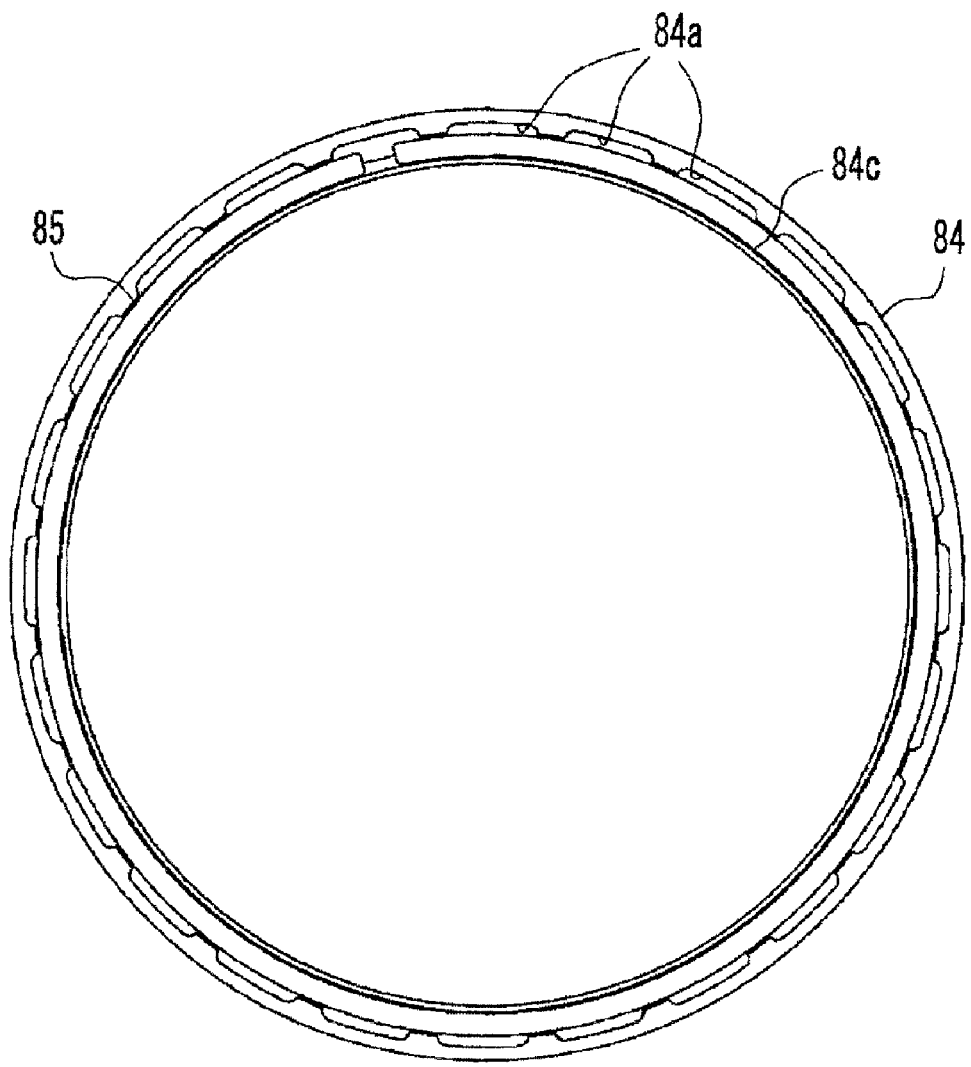
FIG. 7 is a front view showing a state in which the retainer and circlip are attached to a clutch housing according to the first embodiment.
Figure 8:
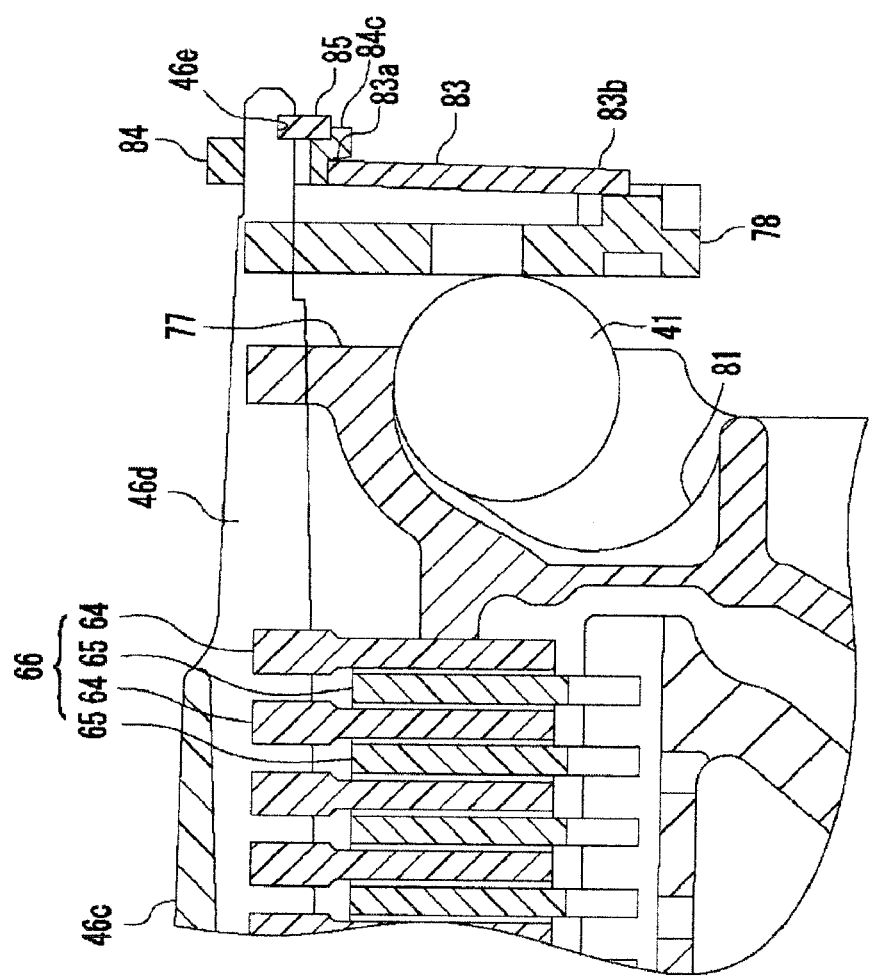
FIG. 8 is an enlarged partial cross-sectional view of a clutch utilizing the retainer and circlip of FIG. 7 according to the first embodiment.

As shown in FIGS. 7 and 8, the retainer 84 is locked to the arms 46d by the circlip 85. The circlip 85 is fitted into a groove 46e provided in each arm 46d on the inner periphery of the housing body 46c (see FIG. 4). The retainer 84 is locked to the arms 46d and supports an outer side end 83a of the disc spring 83. The roller retainer 78 supports an inner side end 83b of the disc spring 83 as shown in FIG. 8. The retainer 84 experiences a reaction force to the biasing force of the disc spring 83 against each roller weight 41, with the force being applied from left to right in FIG. 8. The circlip 85 is fitted into the circlip groove 46e so as to prevent detachment of the retainer 84 from the housing body 46c by this reaction force. Further, by fitting the circlip 85 into the circlip groove 46e, the circlip 85 restricts movement of at least the pressure plate 77 and the roller weight 41 (among constituent elements of the clutch 2) in the axial direction of the main shaft 33 (see FIG. 3). Due to this, it is possible to ensure that the pressure plate 77 receives the centrifugal force of each roller weight 41 generated by rotation of clutch housing 46.

Moreover, as shown in FIGS. 7 and 8, the circlip 85 is suppressed from deforming radially inward by the stopper 84c provided on the retainer 84. The height of the stopper 84c (when viewed in the crosswise direction in FIG. 6b) is not limited to a specific value and may be set to any height capable of suppressing the radial inward deformation of the circlip 85 during actuation of the power unit 3 so as to prevent detachment of the circlip 85.

By way of example, the circlip 85 locks the retainer 84 and is fitted into the housing body 46c in the following order. In the clutch 2 shown in FIG. 3, in a state in which a region surrounded by the clutch housing 46 is accessible (a state in which the clutch cover 31 is detached and in which the power-assist mechanism 200 is not mounted in FIG. 3), the arms 46d of the clutch housing 46 are inserted into the mount holes 84a of the retainer 84. After inserting the retainer 84 onto the arms 46d, the slide shaft 201 is rotated in a predetermined direction by a tool such as a driver to allow the pressure plate 77 to press-contact the plate group 66. By forcibly applying the pressing force against the plate group 66 to the pressure plate 77 from outside of the clutch 2, the reaction force (to the biasing force of the disc spring 83 against each roller weight 41) experienced by the retainer 84 is eliminated.

After allowing the pressure plate 77 to press the plate group 66, the outer diameter of the circlip 85 is reduced to be smaller than the inner diameter of the circlip groove 46e. The outer diameter of the circlip 85 is reduced by compressing the circlip 85 until contact occurs between left and right terminal ends of the circlip 85 which are normally separated from each other by the slit or notched portion 85b, as shown in FIG. 5. The reduced circlip 85 is fitted into the circlip groove 46e.

The outer circumference side of the circlip 85 is fitted into the circlip groove 46e. Further, even if the diameter of the circlip 85 is reduced during actuation of the power unit 3, the inner arcuate surface of the circlip 85 would be contacted by the stopper 84c. Due to this, reduction of the inner diameter of the circlip 85 is restricted. In other words, the inner diameter of the circlip 85 is hardly reduced during actuation of the power unit 3. It is, therefore, possible to prevent detachment of the circlip 85 from the arms 46d by providing the stopper 84c on the retainer 84.

First Modification

Figure 9:
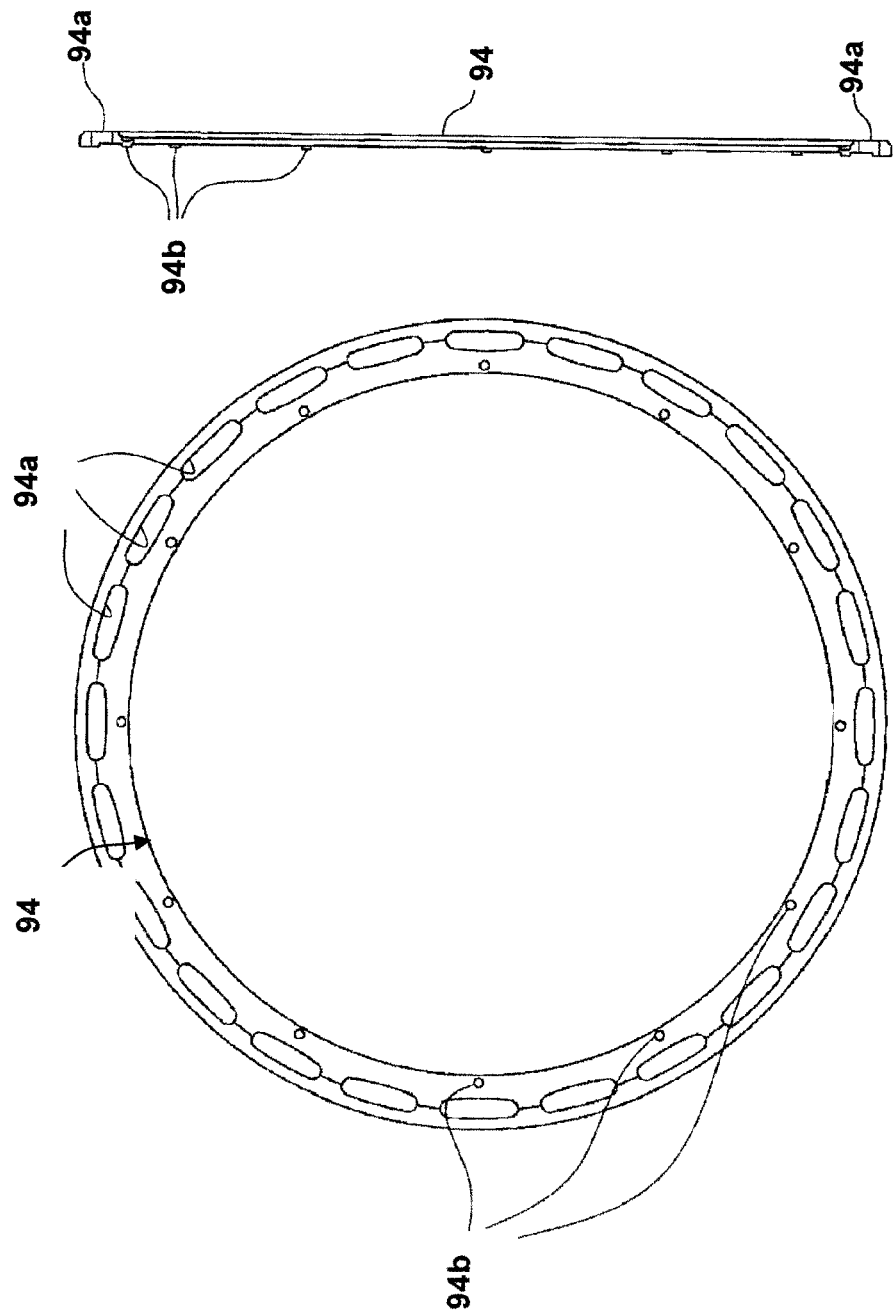
Figure 10:
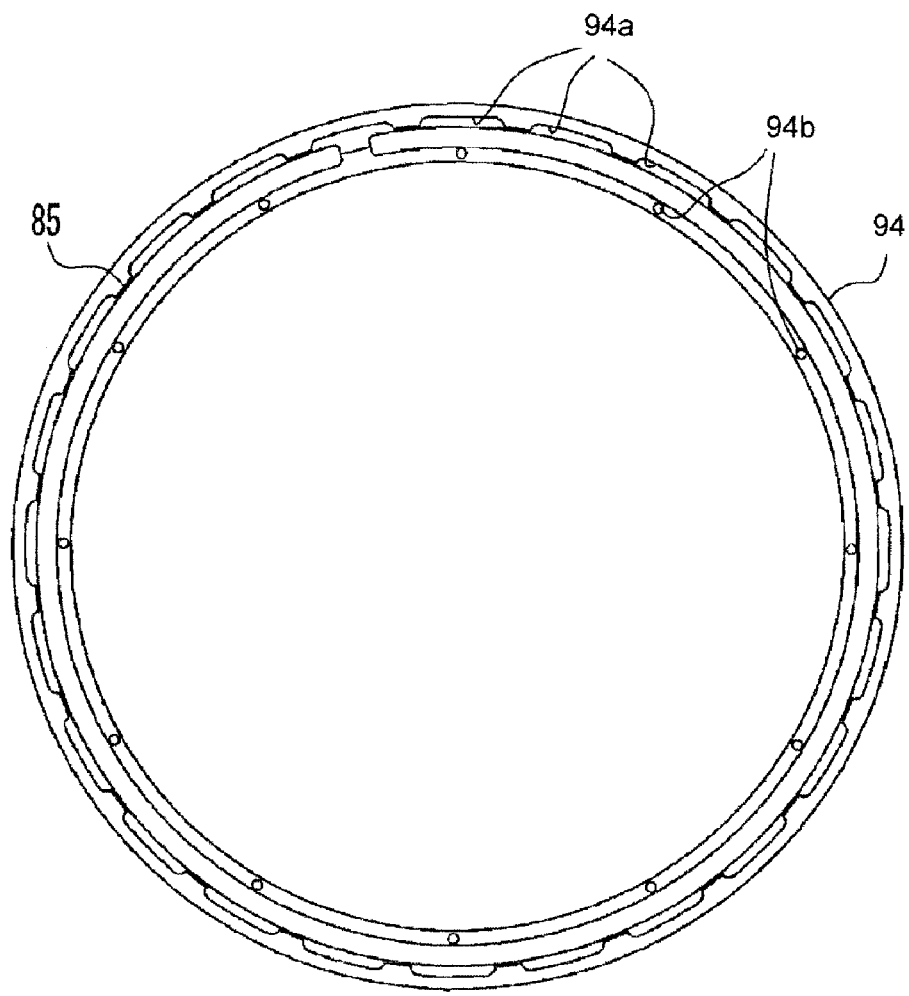
FIG. 10 is a front view showing a state in which the retainer of FIG. 9a and a circlip are attached to a clutch housing according to the first modification.
Figure 11:
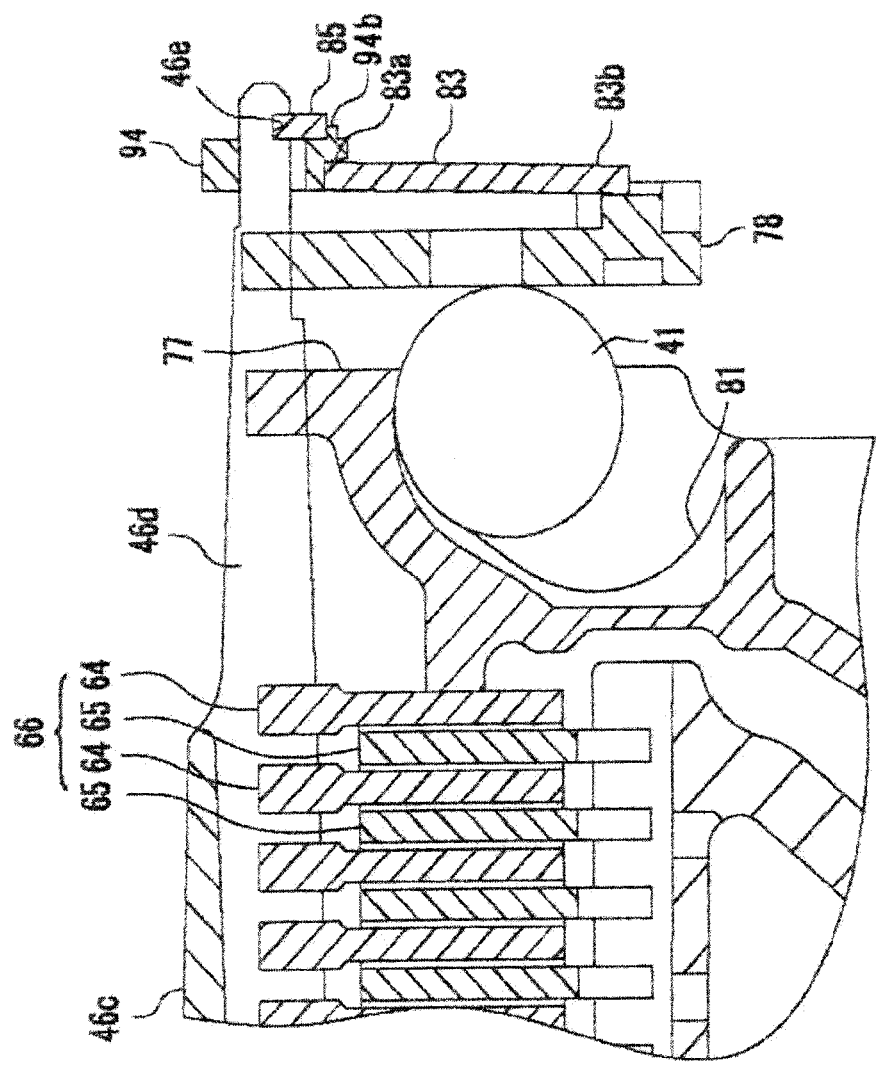
FIG. 11 is an enlarged partial cross-sectional view of a clutch according to the first modification.

Circlip 85 of FIG. 5(a) may also be utilized in a first modification of the above-described embodiment. Further, as shown in FIGS. 9a and 9b, pin stoppers 94b are provided in a circular fashion on a retainer 94 according to the first modification. The pin stoppers 94b are ribs formed on a front surface of the retainer 94. As shown in FIGS. 10 and 11, the retainer 94 is locked to the arms 46d by the circlip 85. The circlip 85 is suppressed from deforming radially inward by the stoppers 94b provided on the retainer 94. The number of the stoppers 94b and spacing intervals thereof are not limited specifically. Further, the height of each of the stoppers 94b (when viewed in the crosswise direction in FIG. 9b) is not limited to a specific value and may be set to any height capable of suppressing the radial inward deformation of the circlip 85 so as to prevent detachment of the circlip 85 during actuation of a power unit 3.

It is to be noted that the manner of forming the stoppers 84b is not limited to forming of ribs on the surface of the retainer 84. For example, commonly used screws may be screwed into screw holes (not shown) provided in the retainer 84 with the heads of the screws which remain on the surface of the retainer 84 being used as the stoppers, respectively.

Second Modification

Figures 12A, 12B:
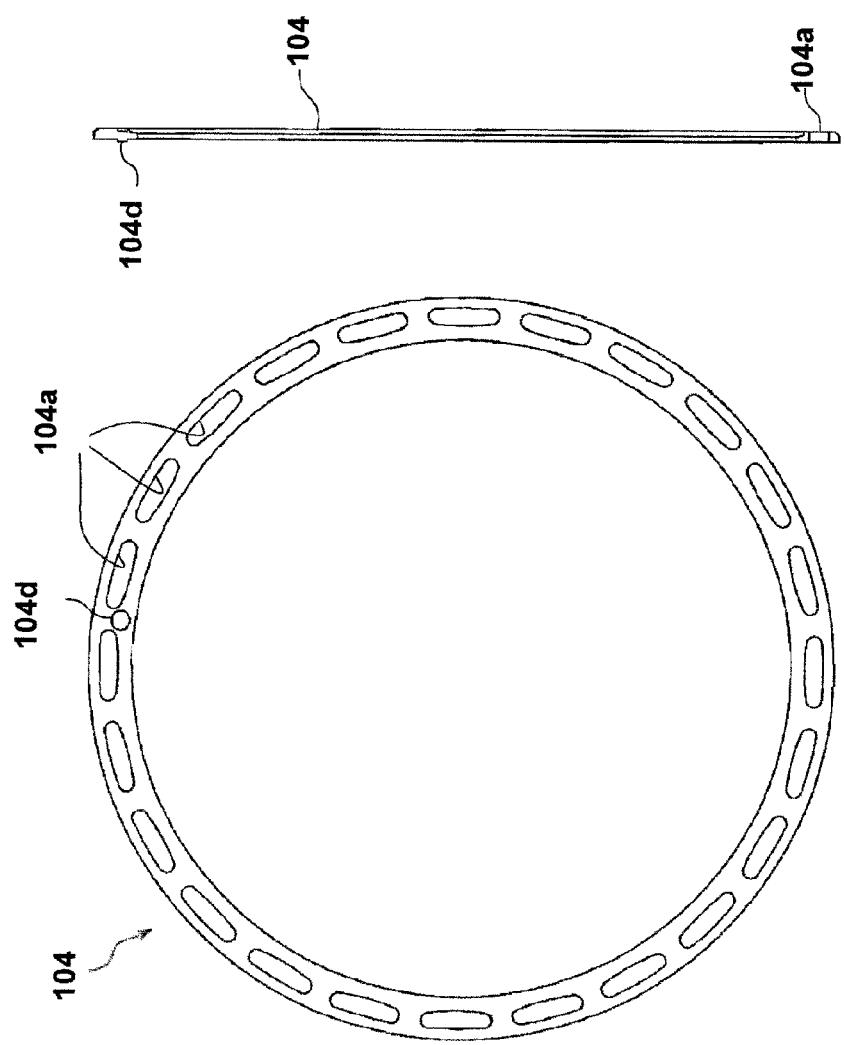
Figure 13:
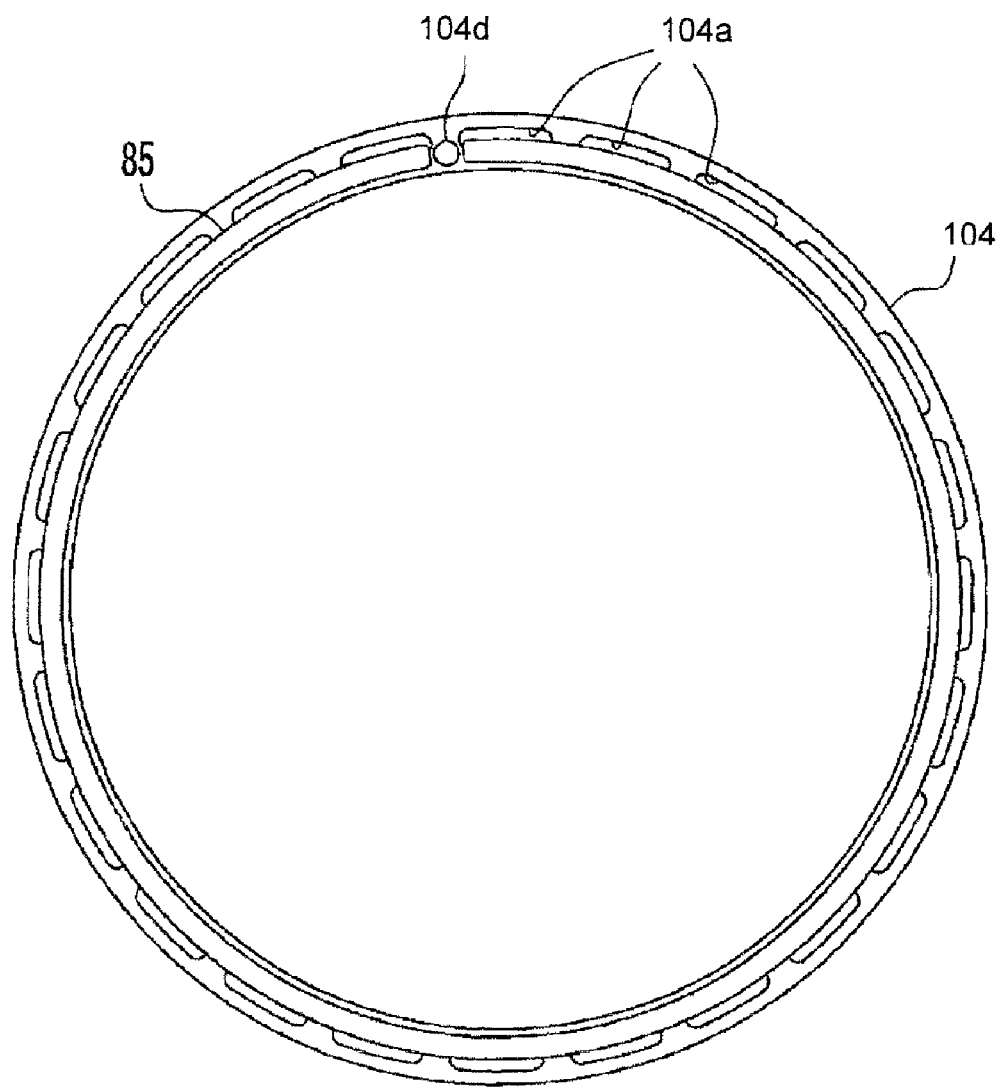
FIG. 13 is a front view showing a state in which the retainer of FIG. 12a and a circlip are attached to a clutch housing according to the second modification.
Figure 14:
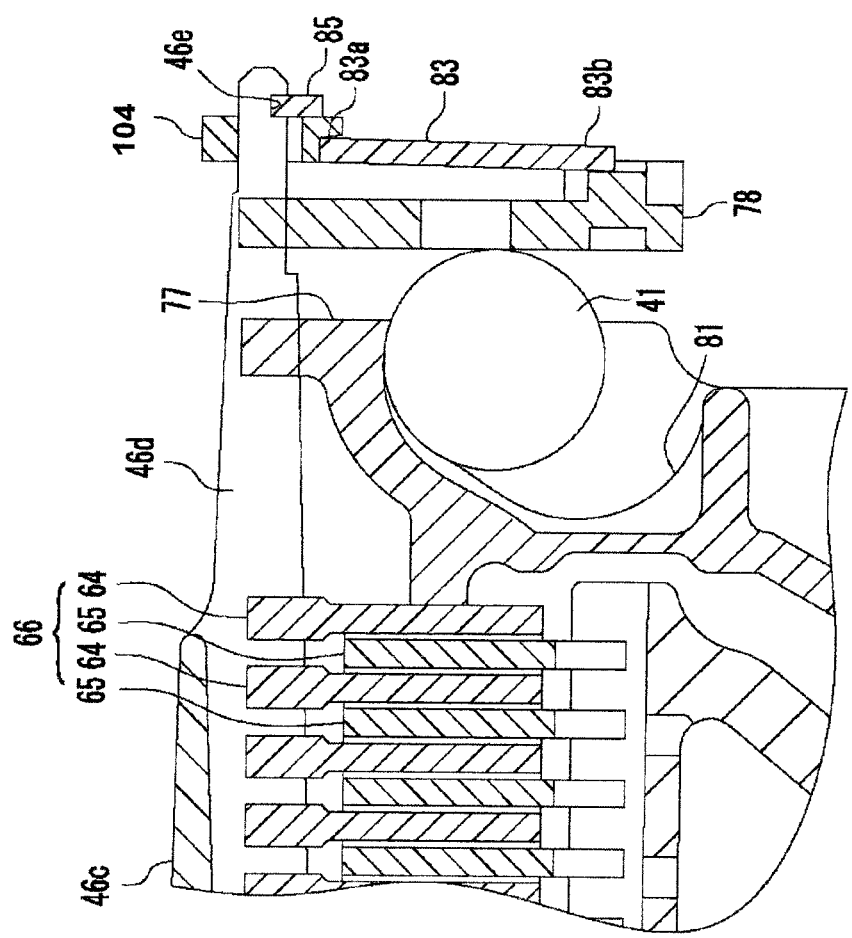
FIG. 14 is an enlarged partial cross-sectional view of a clutch utilizing the retainer of FIG. 12.

Circlip 85 of FIG. 5(a) may also be utilized in a second modification of the above-described first embodiment. The circlip 85 used in the second modification is similar to the circlip 85 used in the first modification. Further, as shown in FIGS. 12a and 12b, a stopper 104d is provided in one portion of an annular retainer 104. The stopper 104d is a rib formed on a front surface of the retainer 104. As shown in FIGS. 13 and 14, the retainer 104 is locked to arms 46d by the circlip 85. The circlip 85 is suppressed from deforming radially inward by the stopper 104d (provided on the retainer 104) and housing body 46c. The position of the stopper 104d is not limited to a specific position on the annular portion of the front surface of the retainer 104. The position of the stopper 104d may be set to a position capable of suppressing the radial inward deformation of the circlip 85 so as to prevent the detachment of the circlip 85 during actuation of power unit 3.

It is to be noted that the manner of forming the stopper 104d is not limited to forming a rib on the front surface of the retainer 104. For example, a commonly used bolt may be screwed into a bolt hole (not shown) provided on the outer surface of the annular portion of the retainer 104 with the head of the bolt, which remains on the surface of the retainer 84, being used as a stopper.

Advantages of the First Embodiment

As stated so far, the clutch 2 according to the first embodiment can suppress the radially inward deformation of the circlip 85 during driving of the engine 4. By suppressing the radially inward deformation of the circlip 85, detachment of the circlip 85 from the clutch housing 46 can be prevented.

The clutch 2 according to the first embodiment includes a stopper suppressing the radially inward deformation of the circlip 85. The stopper suppressing the radially inward deformation of the circlip 85 is the stopper 84c, stoppers 94b or the stopper 104d provided on the surface of the retainer 84, the retainer 94 and the retainer 104, respectively. The circlip 85 is suppressed from deforming radially inward by the stopper during driving of the engine 4. It is, therefore, possible to prevent detachment of the circlip 85 from the clutch housing 46. Furthermore, if one of the stoppers 84c, 94b or 104d is provided on the surface of the retainer 84, the retainer 94 and the retainer 104, respectively, the position of the circlip 85 in the housing body 46c can be held and the circlip 85 can be prevented from detaching from the arms 46d without increasing the number of components related to the clutch 2.

The clutch 2 according to the present embodiment is a centrifugal friction clutch. The clutch 2 includes the centrifugal weights 41 and the roller retainer 78. Each of the centrifugal weights 41 receives a centrifugal force by rotation of the clutch housing 46 and moves radially outward from the axis of the main shaft 33. Each of the cam surfaces 81, which are provided on the pressure plate 77, restricts movement of one of the centrifugal weights 41 in the centrifugal direction and converts the centrifugal force into a force in the axial direction of the main shaft 33. The roller retainer 78 stops movement of the centrifugal weight 41 in the axial direction and supports the inner side end 83b of the disc spring 83. Further, the retainer 84 supports the outer side end 83a of the disc spring 83. By supporting the outer side end 83a of the disc spring 83, the retainer 84 receives the biasing force of the disc spring 83. Due to this, in the centrifugal friction clutch 2 according to the present embodiment, the biasing force of the disc spring 83 loaded onto the retainer 84 is greater than when compared with a non-centrifugal friction clutch. Moreover, the circlip 85 locks the retainer 84, 94 or 104, respectively, by being fitted into the housing body 46c. Therefore, the clutch 2 according to the first embodiment exhibits a greater advantage of preventing the detachment of the circlip 85 than that of the non-centrifugal friction clutch.

The clutch 2 according to the present embodiment is a multiple-disc friction clutch. The clutch 2 includes a plurality of friction plates 64 supported on the clutch housing 46 and a plurality of clutch plates 65 supported on the clutch boss 48. The plurality of friction plates 64 and the plurality of clutch plates 65 are alternately arranged in a predetermined direction. Further, the pressure plate 77 forces the friction plates 64 to make contact with the clutch plates 65 by moving in the predetermined direction. The disc spring 83 applies a (biasing) force assisting in making the contact between the friction plates 64 and the clutch plates 65. The retainer 84 receives the biasing force of the disc spring 83 by supporting the outer side end 83a of the disc spring 83. The disc spring 83 needs a greater biasing force than that in a friction clutch that is not of the multiple-disc type having a plurality of pairs of friction plates 64 and clutch plates 65. Due to this, in the multiple-disc friction clutch according to the present embodiment, the biasing force of the disc spring 83 loaded onto the retainer 84 is greater than that in the friction clutch that is not of the multiple-disc type. Further, the circlip 85 locks the retainer 84 by being fitted into the housing body 46c. Therefore, the clutch 2 according to the present embodiment exhibits a greater advantage of preventing detachment of the circlip 85 than that of the friction clutch that is not of the multiple-disc type.

The clutch 2 according to the first embodiment includes the power-assist mechanism 200. By including the power-assist mechanism 200 in a large-capacity clutch such as the clutch 2, it is possible to facilitate disengaging the clutch 2 by the clutch lever 24 (FIG. 1). Namely, as compared with a clutch that does not include the power-assist mechanism 200, the force required to disengage the clutch can be reduced. In other words, the power-assist mechanism 200 is provided in the clutch so as to reduce the force required to manipulate the large-capacity clutch. In the clutch 2 according to the embodiment, the diameter of each of the plates, for example, the friction plates 64 and the clutch plates 65, as related to disengagement of the clutch 2 is larger than that of each of plates in a small-capacity clutch. Accordingly, the diameter of the clutch housing 46 covering up the friction plates 64 and the clutch plates 65 is larger than that in the small-capacity clutch. Moreover, the disc spring 83 applies the force assisting in the contact between the friction plates 64 and the clutch plates 65. Due to this, the disc spring 83 needs a greater biasing force than that in the small-capacity clutch.

The retainer 84 receives the reaction force to the biasing force of the disc spring 83 by supporting the outer side end 83a of the disc spring 83. The circlip 85 locks the retainer 84 by being fitted into the arms 46d of the housing body 46c. In the large-diameter clutch, the inner diameter of the circlip 85 is large compared with the small-diameter clutch. Due to this, during actuation of the power unit 3, a greater centrifugal force is generated on the entire circlip 85 than in the small-capacity clutch. If a relatively great centrifugal force is generated on the entire circlip 85, a greater frictional force is generated between the outer circumferential side of the circlip 85 and the inner hull of the housing body 46c. If such a relatively great frictional force is dropped instantaneously, the probability of deforming the circular portion of the circlip 85 increases. If the circlip 85 deforms, the circlip 85 may possibly detach from the housing body 46c. Therefore, the clutch 2 according to the present embodiment exhibits the advantage of being more capable of preventing the detachment of the circlip 85 than that of the small-capacity clutch.

The clutch 2 according to the embodiment can be used in a vehicle. The vehicle including the clutch 2 can run stably in various running conditions because the detachment of the circlip 85 is prevented.

Moreover, the clutch 2 according to the present embodiment can be used in a motorcycle. The motorcycle often requires complicated throttle operation as compared with other types of vehicles. Further, during running, the engine 4 is driven at higher engine speed than that of the engine of the other types of vehicles. Due to this, the main shaft 33 of the clutch 2 is driven at a higher rotational speed. A greater centrifugal force is generated on the circlip 85 fitted into the clutch housing 46 by driving at the higher engine speed. If a relatively great centrifugal force is generated on the entire circlip 85, a greater frictional force is generated between the outer circumferential side of the circlip 85 and the inner hull of the housing body 46c. If such a relatively great frictional force is dropped instantaneously, the probability of deforming the circular portion of the circlip 85 increases. If the circlip 85 deforms, the circlip 85 may possibly detach from the housing body 46c. Therefore, the clutch 2 according to the embodiment exhibits the greater advantage of preventing the detachment of the circlip 85 by being included in the motorcycle 1.

Second Embodiment

In the previous embodiment, at least one stopper is provided on the retainer as means for suppressing the radially inward deformation of the circlip 85. However, the means for suppressing the radially inward deformation of the circlip 85 is not necessarily limited to a structure provided on the retainer 84. For example, as shown below, the circlip 85 may also be structured to suppress the radially inward deformation of the circlip 85.

Figures 16A, 16B:
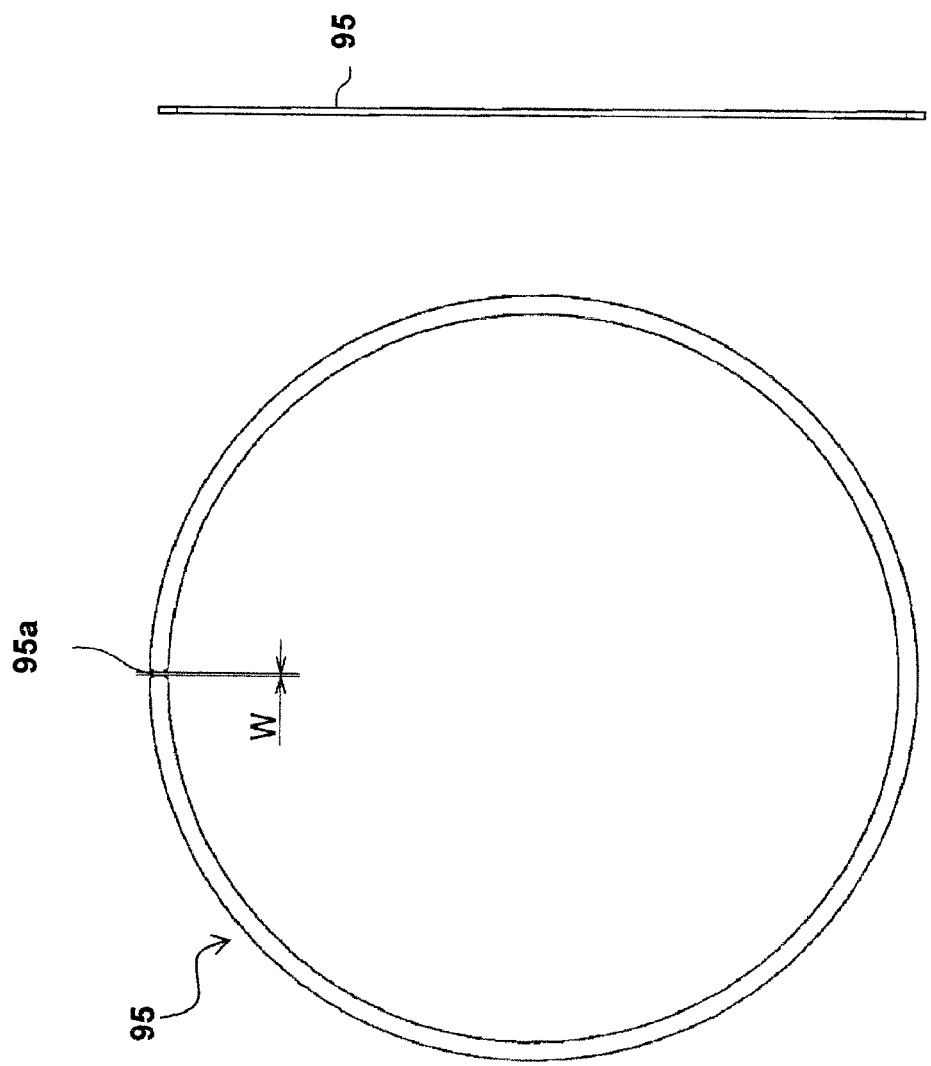

As shown in FIGS. 16a and 16b, a circlip 95 is substantially ring-shaped so as to lock a retainer 304 (FIGS. 15a and 15b) to housing body 46c. Circlip 95 is provided with a slit or notched portion 95a as depicted in FIG. 16a. The shape and angular inclination of the slit 95a are not limited specifically as long as the annular portion of the circlip 95 is broken in one portion. In FIG. 16a, the slit 95a bisects the annular portion of circlip 95 at a right angle to the outer circumference of the circlip 95. A width W of the slit 95a, as shown in FIG. 16a, is smaller than the difference in length between the outer radius and the inner radius of the circlip 95. In other words, the width W satisfies the relationship $T<(D1-D2)/2$, wherein the outer diameter of the circlip 95 is designated D1, the inner diameter thereof is designated D2, and T stands for the width W of the slit 95a.

As shown in FIGS. 15a and 15b, the retainer 304 has such a shape as to be fitted into an outer hull of the housing body 46c. In this embodiment, a clutch housing 46 has a cylindrical shape. Due to this, the retainer 304 has an annular shape. Mount holes 304a are formed in the retainer 304 and arms 46d (see FIGS. 3 and 4) of the housing body 46c are fitted into the mount holes 304a.

Figure 17:
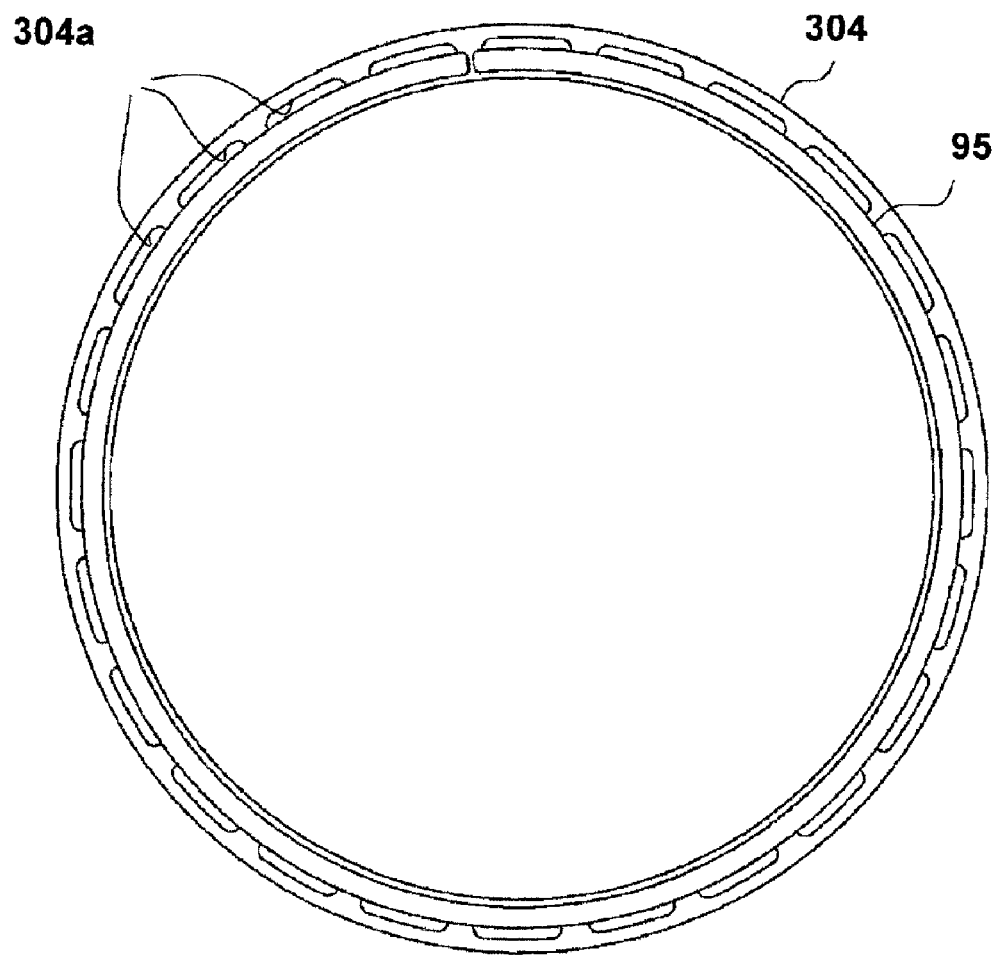
FIG. 17 is a front view showing a state in which the retainer and circlip of FIGS. 15a and 16b, respectively, are attached to a clutch housing.
Figure 18:
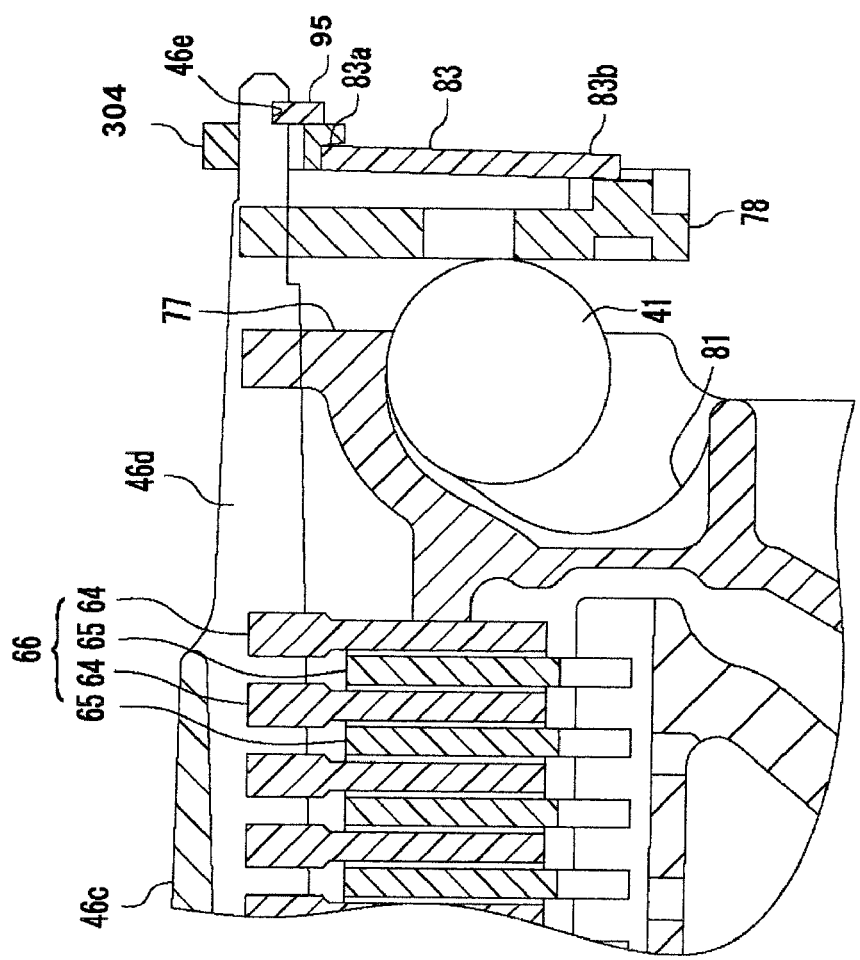
FIG. 18 is an enlarged partial cross-sectional view of a clutch utilizing the retainer and circlip of FIG. 17.

As shown in FIGS. 17 and 18, the retainer 304 is locked to the arm 46d by the circlip 95. A circlip groove 46e, into which the outer circumferential side of the circlip 95 is fitted, is provided in each of the arms 46d on an inner periphery of the housing body 46c (see FIG. 4). The retainer 304 is locked to the arms 46d and supports the outer side end 83a of disc spring 83. Roller retainer 78 supports the inner side end 83b of the disc spring 83, as stated above. The retainer 304 experiences a reaction force to the biasing force of the disc spring 83 against each roller weight 41, with the force being applied from left to right in FIG. 18. The circlip 95 is fitted into the circlip groove 46e so as to prevent detachment of the retainer 304 from the housing body 46c by this reaction force. Further, by fitting the circlip 95 into the circlip groove 46e, the circlip 95 restricts movement of at least the pressure plate 77 and the roller weight 41 (among constituent elements of the clutch 2) in the axial direction of the main shaft 33 (see FIG. 3). Due to this, it is possible to ensure that the pressure plate 77 receives the centrifugal force of each roller weight 41 generated by rotation of clutch housing 46.

By way of example, the circlip 95 locks the retainer 304 and is fitted into the housing body 46c in the following order. In the clutch 2 shown in FIG. 3, in a state in which a region surrounded by the clutch housing 46 is accessible (a state in which the clutch cover 31 is detached and in which the power-assist mechanism 200 is not mounted in FIG. 3), the arms 46d of the clutch housing 46 are inserted into the mount holes 304a of the retainer 304. After inserting the retainer 304 onto the arms 46d, the slide shaft 201 is rotated in a predetermined direction by a tool such as a driver to allow the pressure plate 77 to press-contact the plate group 66. By forcibly applying the pressing force against the plate group 66 to the pressure plate 77 from outside of the clutch 2, the reaction force (to the biasing force of the disc spring 83 against each roller weight 41) experienced by the retainer 304 is eliminated.

After allowing the pressure plate 77 to press the plate group 66, the outer diameter of the circlip 95 is reduced to be smaller than the inner diameter of the circlip groove 46e. The outer diameter of the circlip 95 is reduced by compressing the circlip 95 to cross the left and right terminal ends, which are normally separated by slit 95a as shown in FIG. 16a, with each other. The reduced circlip 95 is fitted into the circlip groove 46e.

Figure 4:
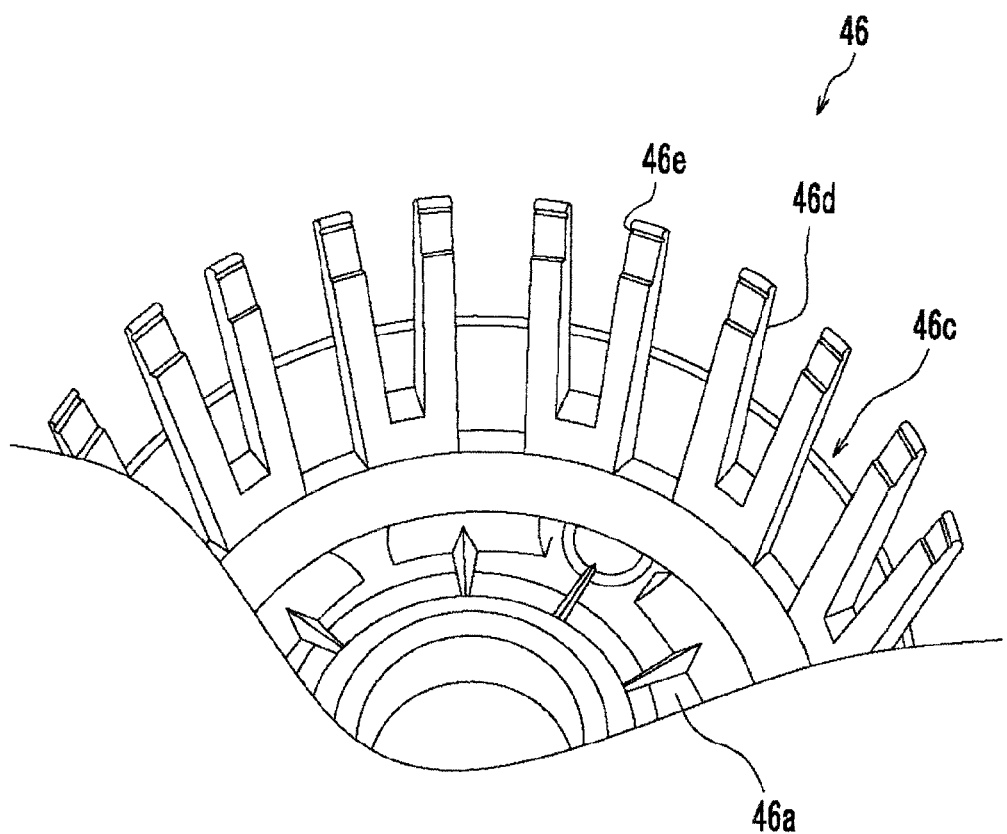
FIG. 4 is a partial perspective view of a clutch housing viewed obliquely from the top.

In the circlip 95 with the reduced outer diameter, the crossing portions overlap each other on front and rear surfaces of the sheet of FIG. 16 (i.e., crosswise in FIGS. 3 and 4). A portion in which the left and right terminal ends of the circlip 95 overlap each other has a thickness that is twice or more as large as that of other portions of the circlip 95. Due to this, one of the circlip grooves 46e has a width twice or more as large as that of the other circlip grooves 46e in one of the portions and regions of the plurality of arms 46d so that the portion in which the left and right terminal ends of the circlip 95 overlap each other can be fitted into the housing body 46c. The portion and region in which the twice or more width is set are not limited to a specific one of the arms 46d as long as the circlip 95 does not detach during actuation of power unit 3.

Even if the inner diameter of the circlip 95 is reduced during actuation of the power unit 3, the left and right terminal ends of the circlip 95 can contact each other in the area defined by the slit 95a. Namely, even if the inner diameter of the circlip 95 is to be reduced, the inner diameter is hardly reduced during actuation of the power unit 3 since both terminal ends of the circlip 95 across the slit 95a abut on each other. Therefore, it is possible to prevent detachment of the circlip 95 from the arms 46d by providing the slit 95a in the circlip 95.

The clutch 2 according to the second embodiment is configured to suppress the radially inward deformation of the circlip 95. Examples of a configuration for suppressing the radially inward deformation of the circlip 95 include the slit 95a formed by bisecting the annular circlip 95. By providing the slit 95a, the left and right terminal ends of the circlip 95 can contact each other in the area defined by the slit or notched portion 95a even if the inner diameter of the circlip 95 is to be reduced while engine 4 is being driven. Namely, even if the inner diameter of the circlip 95 is to be reduced, both terminal ends of the circlip 95 abut on each other in the slit or notched portion 95a. Due to this, the inner diameter of the circlip 95 is hardly reduced during actuation of the power unit 3. It is, therefore, possible to prevent detachment of the circlip 95 from the clutch housing 46.

It is to be clearly understood that the above description was made only for purposes of an example and not as a limitation on the scope of the invention as claimed herein below.

What is claimed is:

1. A friction clutch transmitting a drive force of an engine, the friction clutch comprising:
    a clutch housing adapted to be driven to rotate by the engine, the clutch housing including a first plate;
    a clutch boss including a second plate, the second plate being operatively disposed relative to the first plate in a predetermined direction;
    a pressure plate arranged to rotate with the clutch housing, the pressure plate configured to press the first plate into the second plate by moving in the predetermined direction;
    a clutch spring operatively coupled to the pressure plate and applying a biasing force via the pressure plate in a direction of causing the first plate and the second plate to contact each other;
    a retainer having a substantially circular shape mounted onto the clutch housing away from the pressure plate and receiving a reaction force to the biasing force of the clutch spring by supporting a first end of the clutch spring opposite the pressure plate; and
    a retaining ring having a substantially annular shape and including a notch extending therethrough in a radial direction, the retaining ring being fitted into an inner peripheral side of the clutch housing and configured to secure the retainer on the clutch housing; wherein
    the retainer includes at least one stopper abutting a circumferentially inward surface of the retaining ring so to suppress the retaining ring from deforming radially inward within the clutch housing.

2. The friction clutch of claim 1, wherein the at least one stopper is an integral part of the retainer.

3. The friction clutch of claim 1, further comprising a roller weight that moves radially outward within the clutch housing under a centrifugal force generated during rotation of the clutch housing, the roller weight increasing the force by which the pressure plate presses the first plate into the second plate as the roller weight moves outward in the radial direction.

4. The friction clutch of claim 3, further comprising a roller retainer operatively coupled between the roller weight and the clutch spring.

5. The friction clutch of claim 4, wherein the roller retainer supports a second end of the clutch spring.

6. The friction clutch of claim 4, wherein the roller retainer is coupled to the clutch housing.

7. The friction clutch of claim 1, further comprising a power-assist mechanism which receives torque from the pressure plate and converts the torque into a force to move the pressure plate in a direction of separating the first plate from the second plate for clutch disengagement.

8. A vehicle comprising:
    the friction clutch of claim 1, wherein the friction clutch disengageably transmits a drive force from the engine toward a driving wheel.

9. A motorcycle comprising:
    the friction clutch of claim 1.

10. The friction clutch of claim 3, wherein the retaining ring restricts movement of the pressure plate and the roller weight in an axial direction of a main shaft, the main shaft extending through the clutch housing.

11. The friction clutch of claim 1, wherein the retaining ring is a circlip.

12. The friction clutch of claim 1, wherein the at least one stopper includes a plurality of pin stopper members.

13. The friction clutch of claim 12, wherein the plurality of pin stopper members are provided in a substantially circular arrangement on an outer surface of the retainer.

14. The friction clutch of claim 12, wherein the plurality of pin stopper members are configured as ribs provided on the outer surface of the retainer.

15. The friction clutch of claim 12, wherein the retaining ring is suppressed from deforming radially inward by the plurality of pin stopper members.

* * * * *